United States Patent
Goldshtein et al.

(10) Patent No.: US 12,518,737 B2
(45) Date of Patent: Jan. 6, 2026

(54) STRUCTURED DESCRIPTION-BASED CHATBOT DEVELOPMENT TECHNIQUES

(71) Applicant: GOOGLE LLC, Mountain View, CA (US)

(72) Inventors: Sasha Goldshtein, Tel Aviv (IL); Yoav Tzur, Tel Aviv (IL); Asaf Aharoni, Ramat Hasharon (IL); Ofer Ron, Givatayim (IL)

(73) Assignee: GOOGLE LLC, Mountain View, CA (US)

( * ) Notice: Subject to any disclaimer, the term of this patent is extended or adjusted under 35 U.S.C. 154(b) by 203 days.

(21) Appl. No.: 18/063,378

(22) Filed: Dec. 8, 2022

(65) Prior Publication Data

US 2024/0194180 A1     Jun. 13, 2024

(51) Int. Cl.
    *G10L 13/047*     (2013.01)
    *H04L 51/02*     (2022.01)

(52) U.S. Cl.
    CPC ............ *G10L 13/047* (2013.01); *H04L 51/02* (2013.01)

(58) Field of Classification Search
    CPC ....... G10L 13/047; G10L 13/00; G10L 15/22; H04L 51/02; G06N 3/006; G06N 3/0495;

(Continued)

(56) References Cited

U.S. PATENT DOCUMENTS 10,665,238 B1 *  5/2020  Bermudez-Cisneros ................... G06F 3/167
2007/0032225 A1 *  2/2007  Konicek .................. F24F 11/62 455/417

(Continued)

FOREIGN PATENT DOCUMENTS

WO     2019042738 A1     3/2019

OTHER PUBLICATIONS

Generating Chat Bots from Web API Specifications; Association for Computing Machinery. 2017 (Year: 2017).*

(Continued)

*Primary Examiner* — Darioush Agahi
(74) *Attorney, Agent, or Firm* — Gray Ice Higdon

(57) ABSTRACT

Implementations are directed to receiving unstructured free-form natural language input, generating a chatbot based on the unstructured free-form natural language input and in response to receiving the unstructured free-form natural language input, and causing the chatbot to perform engage in corresponding conversations with additional users. In various implementations, the unstructured free-form natural language input implicitly defines a corresponding dialog state map (e.g., defines corresponding dialog states and/or corresponding dialog state transitions) without defining any explicit dialog states and/or explicit dialog state transitions. In other implementations, the unstructured free-form natural language input is assigned to explicit dialog states and/or explicit dialog state transitions. Nonetheless, the unstructured free-form natural language input may be utilized to fine-tune and/or primed a machine learning model that is already capable of being utilized in conducting generalized conversations. As a result, the chatbot can be generated and deployed in a quick and efficient manner.

15 Claims, 8 Drawing Sheets

(58) Field of Classification Search
CPC ...... G06N 3/096; G06N 3/0442; G06N 3/045; G06F 40/30; G06F 40/35
See application file for complete search history.

(56) References Cited

U.S. PATENT DOCUMENTS

| | | | | |
|---|---|---|---|---|
| 2012/0271631 | A1* | 10/2012 | Weng | G10L 15/18 |
| | | | | 704/243 |
| 2013/0030802 | A1* | 1/2013 | Jia | G10L 15/06 |
| | | | | 704/E15.001 |
| 2016/0111082 | A1* | 4/2016 | Molloy | G10L 19/00 |
| | | | | 704/207 |
| 2017/0300831 | A1* | 10/2017 | Gelfenbeyn | H04L 51/214 |
| 2019/0139537 | A1* | 5/2019 | Akamine | G10L 15/063 |
| 2019/0163694 | A1* | 5/2019 | Yao | G06F 16/338 |
| 2019/0197111 | A1 | 6/2019 | Garrote | |
| 2019/0213244 | A1 | 7/2019 | Hirzel | |
| 2021/0209289 | A1* | 7/2021 | Kandur Raja | G06F 40/109 |
| 2022/0038398 | A1* | 2/2022 | Zhou | H04M 3/527 |
| 2022/0076283 | A1* | 3/2022 | Oliveira | H04L 51/216 |
| 2022/0309240 | A1 | 9/2022 | Rizk | |
| 2023/0107640 | A1* | 4/2023 | Pang | G06F 40/166 |
| | | | | 715/254 |
| 2023/0316006 | A1* | 10/2023 | Tunstall-Pedoe | G06N 3/0442 |
| | | | | 704/9 |
| 2023/0342798 | A1* | 10/2023 | Schultz | G06Q 10/0635 |
| 2024/0155024 | A1* | 5/2024 | Palladino | G06F 8/73 |

OTHER PUBLICATIONS

Vaziri, M. et al., "Generating Chat Bots from Web API Specifications"; Proceedings of the 2017 ACM SIGPLAN International Symposium on New Ideas, New Paradigms, and Reflections on Programming and Software; pp. 44-57; dated Oct. 25, 2017.

European Patent Office; International Search Report and Written Opinion issued in Application No. PCT/US2022/052418; 12 pages; dated Aug. 4, 2023.

* cited by examiner

STRUCTURED DESCRIPTION-BASED CHATBOT DEVELOPMENT TECHNIQUES

BACKGROUND

Humans may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users. For instance, some of these chatbots can conduct conversations with various humans to perform action(s) on behalf of another human or on behalf of an entity. In some of these instances, the conversations can include voice-based conversations, such as conversations conducted locally at a computing device, conducted remotely over multiple computing devices via a telephonic network, or other voice-based scenarios. In other instances, the conversations can include text-based conversations, such as conversations conducted via text or SMS messaging, email, and/or other text-based scenarios.

However, functionality of some of these chatbots may be limited in various manners. For example, functionality of some of these chatbots may be limited by pre-defined intent schemas that the chatbots utilize to perform the action(s). In other words, if a human that is engaged in a given conversation with a given chatbot provides a spoken utterance that is determined to include an intent not defined by the pre-defined intent schemas, the given chatbot may fail. Further, to update these chatbots, existing intent schemas may be modified or new intent schemas may be added. As another example, functionality of some of these chatbots may be limited by a corpus of examples utilized to train the chatbots. In other words, if a human that is engaged in a given conversation with a given chatbot provides a spoken utterance that was not included in the given corpus of examples, the given chatbot may fail. Further, to update these chatbots, existing examples in the corpus may be modified or new examples may be added. However, in both of these examples, there are virtually limitless intent schemas and/or examples that may need to be previously defined to make the bots robust to various nuances of human speech and to mitigate instances of failure.

Notably, extensive utilization of computational resources is required to manually define and/or manually refine such intent schemas and/or examples. Further, even if a large quantity of intent schemas and/or examples are defined, a large amount of memory is required to store and/or utilize the large quantity of intent schemas for these chatbots, and/or to train these chatbots based on the large quantity of examples in the corpus. Accordingly, intent schemas for rules-based chatbots and examples for example-based chatbots are not practically scalable to the extent of learning the nuances of human speech.

SUMMARY

Implementations are directed to receiving unstructured free-form natural language input from a user, generating a chatbot based on the unstructured free-form natural language input and in response to receiving the unstructured free-form natural language input, and causing the chatbot to perform engage in corresponding conversations with additional users that are in addition to the user. In some versions of those implementations, the unstructured free-form natural language input implicitly defines a corresponding dialog state map (e.g., defines corresponding dialog states and/or corresponding dialog state transitions) without explicitly defining any dialog states and/or explicit dialog state transitions. In other versions of those implementations, the unstructured free-form natural language input is assigned to explicit dialog states and/or explicit dialog state transitions. Nonetheless, in various implementations, the unstructured free-form natural language input may be utilized to fine-tune a machine learning (ML) model that is already capable of being utilized in conducting generalized conversations and/or may be utilized as input across the ML model without the ML model being fine-tuned. As a result, the chatbot can be generated and deployed in a quick and efficient manner and for conducting the corresponding conversations on behalf of the user or an entity associated with the user.

For example, assume that the unstructured free-form natural language input corresponds to a natural language description that describes how the chatbot should engage in the corresponding conversations with the additional users. Processor(s) can use various automatic speech recognition (ASR), natural language understanding (NLU), and/or fulfillment techniques to determine that the unstructured free-form natural language input implicitly defines the corresponding dialog state map to be utilized by the chatbot. In this example, the processor(s) can generate a chatbot to engage in the corresponding conversations with the additional users according to the corresponding dialog state map even though the user only provides the natural language description to implicitly define the corresponding dialog state map and without explicitly defining any explicit dialog states or any explicit dialog state transitions. Additionally, or alternatively, the processor(s) can utilize the natural language description at one or more turns of the corresponding conversation and without explicitly fine-tuning the chatbot. Based on the corresponding conversations, the processor(s) can determine responsive content to be provided for presentation to the user of the client device.

In various implementations, the corresponding conversations may be voice-based conversations where the chatbot engages in the corresponding conversations over corresponding phone calls or locally at the client device. In these implementations, the chatbot may additionally or alternatively be referred to as a voice bot. In other implementations, the corresponding conversations may be text-based conversations where the chatbot engages in the corresponding conversations with a text messaging or SMS service, an email service, or other text-based service. Accordingly, the chatbot may be deployed in various environments to engage in the corresponding conversations with various additional users. In some implementations, the chatbots that are generated can be fine-tuned in an "on the fly" manner such that the chatbots are generated in response to receiving the unstructured free-form natural language input. In other implementations, the chatbots that are generated may not be fine-tuned in an "on the fly" manner, but they can be identified and utilized in response to receiving the unstructured free-form natural language input.

In various implementations, the processor(s) may be implemented locally at the client device of the user at which the unstructured free-form natural language input. In some versions of these implementations, the processor(s) may obtain, from on-device storage of the client device, a previously trained large language model (LLM) as the ML model that is already capable of being utilized in conducting more generalized conversations. Further, the processor(s)

may, based on the unstructured free-form natural language input, fine-tune the previously trained LLM to generate a fine-tuned LLM. Moreover, the processor(s) utilize the fine-tuned LLM as the chatbot that engages in the corresponding conversations on behalf of the user. In other versions of these implementations, the processor(s) may obtain, from the on-device storage of the client device, the previously trained LLM as the ML model that is already capable of being utilized in conducting more generalized conversations, but refrain from fine-tuning the previously trained LLM based on the unstructured free-form natural language input.

In other implementations, the processor(s) may be implemented remotely from the client device of the user (e.g., at a remote system, such as a high-performance server or cluster of high-performance servers). In some versions of these implementations, the processor(s) may obtain, from remote storage of a remote system, a previously trained large language model (LLM) as the ML model that is already capable of being utilized in conducting more generalized conversations. Further, the processor(s) may generate the fine-tuned LLM and utilize the fine-tuned LLM as the chatbot that engages in the corresponding conversations on behalf of the user. In other versions of these implementations, the processor(s) may obtain, from the remote storage of the remote system, the previously trained LLM as the ML model that is already capable of being utilized in conducting more generalized conversations, but refrain from fine-tuning the previously trained LLM based on the unstructured free-form natural language input.

Notably, the previously trained LLM may correspond to an existing LLM such as LaMDA, BERT, Meena, GPT-3, and/or any other previously trained LLM. These previously trained LLMs have been previously trained on enormous amounts of diverse data and are capable of engaging in corresponding conversations with users in a natural and intuitive manner. However, these LLMs have a plurality of ML layers and hundreds of millions to hundreds of billions of ML parameters. Accordingly, in implementations where the fine-tuned chatbot is generated locally at the client device, the previously trained LLM that is obtained and fine-tuned may be a sparsified version of the previously trained LLM. In contrast, in implementations where the fine-tuned chatbot is generated remotely from the client device, the previously trained LLM that is obtained and fine-tuned may be an unsparsified version of the previously trained LLM. The sparsified version of the previously trained LLM may have fewer ML layers, fewer ML parameters, masked weights, and/or other sparsified aspects to reduce the size of the previously trained LLM due to various hardware constraints and/or software constraints at the client device compared to the virtually limitless resources of the remote system.

In some implementations, and in causing the chatbot to engage in the corresponding conversations, the processor(s) can process, using the fine-tuned LLM, state/transition data that implicitly or explicitly defines the corresponding dialog states/transitions, additional user data (e.g., output generated using the ASR model(s), NLU model(s), and/or fulfillment model(s) or rule(s), and based on processing responses provided by the additional users during the corresponding conversations), any conversation context data for the corresponding conversations, and/or any other data described herein, to generate output. In other implementations, and in causing the chatbot to engage in the corresponding conversation, the processor(s) can process, using the previously trained LLM (e.g., that is not fine-tuned), the natural language description included in the unstructured free-form natural language input, state/transition data that implicitly or explicitly defines the corresponding dialog states/transitions, additional user data (e.g., output generated using the ASR model(s), NLU model(s), and/or fulfillment model(s) or rule(s), and based on processing responses provided by the additional users during the corresponding conversations), any conversation context data for the corresponding conversations, and/or any other data described herein, to generate the output. The output can be, for example, a probability distribution over a vocabulary or sequence of terms and/or phrases. Based on the probability distribution over the vocabulary or sequence of terms and/or phrases, the processor(s) can select an instance of textual data corresponding to text and/or speech to be provided by the chatbot.

In implementations where the corresponding conversation is a text-based conversation, the processor(s) can cause the instance of the textual data to be visually rendered for presentation to the additional users at the client device and/or at an additional client devices of the additional users. However, in implementations where the corresponding conversation is a voice-based conversation, the processor(s) can cause the chatbot to process, using text-to-speech (TTS) model(s), the instance of the textual data corresponding to generate an instance of synthesized speech audio data that captures synthesized speech corresponding to the textual data. Further, the processor(s) can cause the instance of the synthesized speech audio data to be visually rendered for presentation to the additional users at the client device and/or at the additional client device of the entity. Notably, in implementations where the chatbot corresponds to the previously trained LLM that is fine-tuned based on the unstructured free-form natural language input, the chatbot is capable of generating conversational outputs that are attentioned to the state(s)/transition(s) implicitly and/or explicitly defined by the unstructured free-form natural language input. Further, in implementations where the chatbot corresponds to the previously trained LLM that is not fine-tuned, the chatbot is still capable of generating conversational outputs that are attentioned to the state(s)/transition(s) implicitly and/or explicitly defined by the unstructured free-form natural language input since the unstructured free-form natural language input is still applied as input across the previously trained LLM that is not fine-tuned.

In various implementations, the processor(s) can cause corresponding responsive content to be provided for presentation to the user of the client device that provided the unstructured free-form natural language input. The responsive content may be determined based on one or more responses provided by the additional users during the corresponding conversations. Further, the responsive content may include, for example, a corresponding result of one or more tasks performed during the corresponding conversations, a corresponding summary of the corresponding conversations, and/or other content.

In various implementations, and during the corresponding conversations, the chatbot may utilize one or more peripheral behaviors in engaging in the corresponding conversations with the additional users. These peripheral behaviors can include, for example, greetings behaviors that enable the chatbot to identify the user and/or to identify itself as a chatbot, on hold behaviors that enable the chatbot to pause and resume the corresponding conversations, bailout behaviors that enable the chatbot to terminate the corresponding conversation with the additional users, and/or other peripheral behaviors These peripheral behaviors are some non-limiting examples of why the previously trained LLM enables the chatbot to perform generalized aspects of conversation and without the unstructured free-form natural language input having to specify that the chatbot is able to perform these generalized aspects of conversation. However, the fine-tuned chatbot that is fine-tuned based on the unstructured free-form natural language input enables the chatbot to perform aspects of conversation specified by the user while still being able to perform these generalized aspects of conversation.

By using the techniques described herein, various technical advantages can be achieved. As one non-limiting example, techniques described herein enable processor(s) of a client device and/or remote system to generate a chatbot based on unstructured free-form natural language input to engage in corresponding conversations with additional users and/or utilize an existing chatbot based on unstructured free-form natural language input to engage in corresponding conversations with additional users. These corresponding conversations can be conducted according to implicitly and/or explicitly defined dialog state maps that are specified in natural language description(s) provided by the user. This enables the process(es) to generate and deploy the chatbots in a quick and efficient manner to engage in the corresponding conversations.

The above description is provided as an overview of only some implementations disclosed herein. Those implementations, and other implementations, are described in additional detail herein.

DETAILED DESCRIPTION

Figure 1:
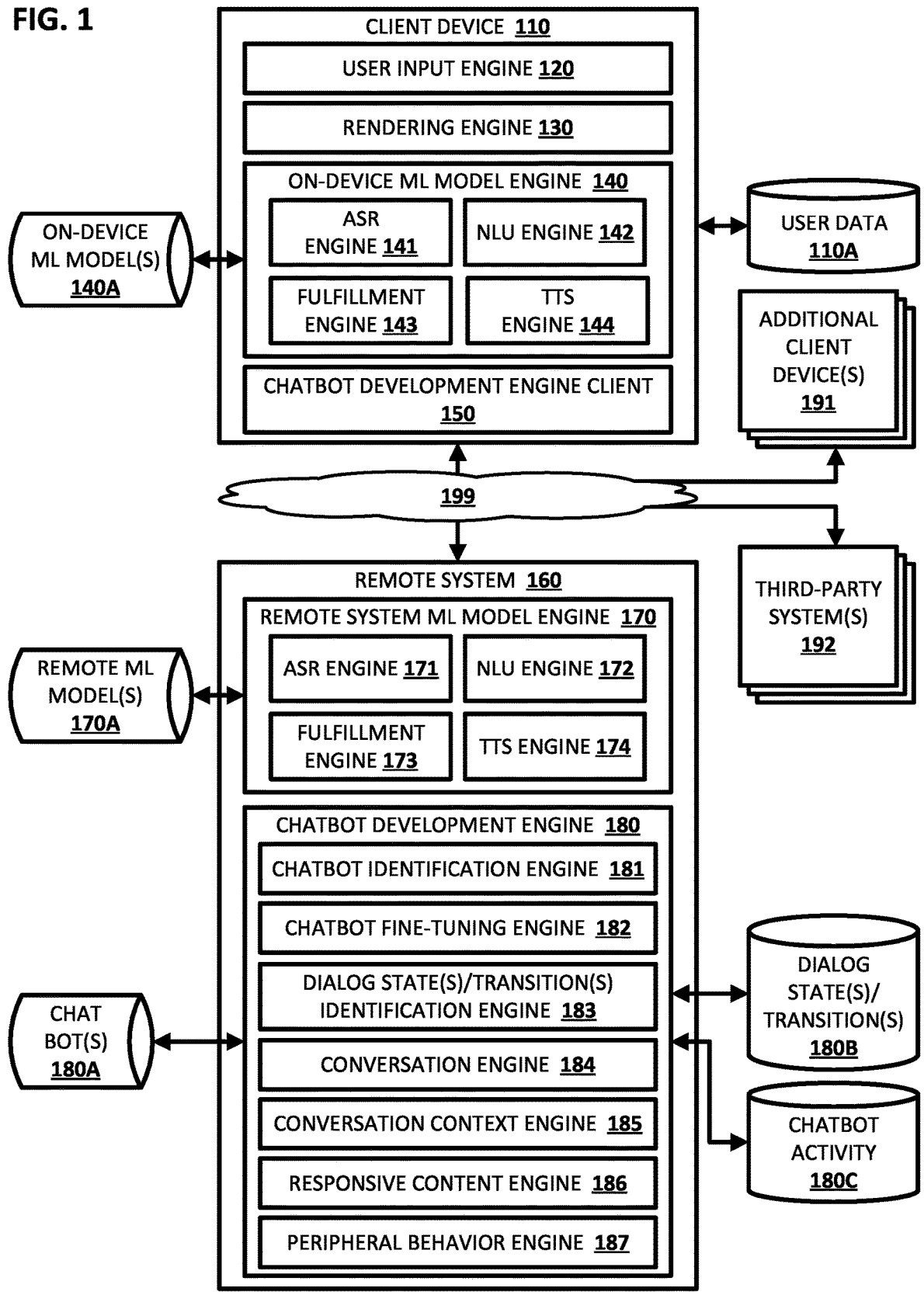
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 120, rendering engine 130, on-device machine learning (ML) model engine 140, and chatbot development engine client 150. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of implementing the chatbot development engine client 150.

The user input engine 120 can detect various types of user input at the client device 110. In some examples, the user input detected at the client device 110 can include spoken input detected via microphone(s) of the client device 110. In these examples, the microphone(s) of the client device 110 can generate audio data that captures spoken utterance(s) included in the spoken input. In other examples, the user input detected at the client device 110 can include touch input detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input. Notably, unstructured free-form natural language inputs described herein may be provided by the user of the client device 110 as any combination of spoken inputs, touch inputs, and/or typed inputs.

The rendering engine 130 can cause responsive content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The responsive content and/or other output can include, for example, various types of user interfaces associated with the chatbot development engine client 150 that may be visually rendered via a user interface of the client device 110, such as unstructured free-form natural language input provided by the user of the client device 110 that implicitly defines a corresponding dialog state map to be utilized by a chatbot in engaging in corresponding conversations with additional users (e.g., that are in addition to the user of the client device 110), unstructured free-form natural language input provided by the user of the client device 110 that explicitly defines a corresponding dialog state map to be utilized by a chatbot in engaging in corresponding conversations with additional users (e.g., that are in addition to the user of the client device 110), various prompts related to the corresponding conversation(s) performed by the chatbot, result(s) and/or summary(ies) of the corresponding conversation(s) performed by the chatbot, and/or any other responsive content or output that be may be visually and/or audibly rendered for presentation to the user at the client device 110.

The on-device ML model engine 140 can include, in various implementations, an automatic speech recognition (ASR) engine 141, a natural language understanding (NLU) engine 142, a fulfillment engine 143, and a text-to-speech (TTS) engine 144. As described in more detail below, these on-device ML model engines of the on-device ML model engine 140 may utilize various on-device ML models (e.g., stored in on-device ML model(s) database 140A) to process various user inputs (e.g., received via the user input engine 120) and to generate various outputs (e.g., to be visually and/or audibly rendered for presentation to the user via the rendering engine 130). In turn, this enables the chatbot development engine client 150 to leverage the on-device ML model engine 140 in processing the various user inputs received at the client device 110 and in generating the various outputs to be provided for presentation to the user at the client device 110.

Further, the client device 110 is illustrated in FIG. 1 as communicatively coupled to a remote system 160 over one or more networks 199 (e.g., any combination of Wi-Fi, Bluetooth, or other local area networks (LANs); ethernet, the Internet, or other wide area networks (WANs); and/or other networks). The remote system 160 includes, in various implementations, remote system ML model engine 170 and chatbot development engine 180. The remote system 160 can be, for example, a high-performance server, a cluster of high-performance servers, and/or any other computing device that is remote from the client device 110.

The remote ML model engine 170 can include, in various implementations, an ASR engine 171, an NLU engine 172, a fulfillment engine 173, and a TTS engine 174. As described in more detail below, these remote ML model engines of the remote engine 170 may utilize various remote ML models (e.g., stored in remote ML model(s) database 170A) to process various user inputs (e.g., received from the client device 110 and via the user input engine 120) and to generate various outputs (e.g., to be transmitted to the client device 110 for visual and/or audible presentation to the user and via the rendering engine 130) and in the same or similar manner as the on-device ML model engine 140. In turn, this enables the chatbot development engine 180 to leverage the remote ML model engine 170 in processing the various user inputs received at the client device 110 and in generating the various outputs to be provided for presentation to the user at the client device 110. In implementations where the remote ML model engine 170 is utilized in processing the various user inputs received at the client device 110 and in generating the various outputs to be provided for presentation to the user at the client device 110, the various user inputs received at the client device 110 may be transmitted from the client device (or additional client device(s) 191) and to the remote system 160 and the various user outputs may be transmitted from the remote system and to the client device 110 (or the additional client device(s) 191).

Notably, the chatbot development engine client 150 of the client device can communicate with the chatbot development engine 180 over the one or more networks 199. The chatbot development engine client 150 and the chatbot development engine 180 form, from the perspective of a user interacting with the client device 110, a logical instance of a chatbot development platform. Although the chatbot development platform is depicted in FIG. 1 as being implemented in a distributed manner over the one or more networks 199 (e.g., via utilization of the chatbot development engine client 150 and the chatbot development engine 180), it should be understood that is for the sake of example and is not meant to be limiting. For example, the chatbot development platform can alternatively be implemented exclusively at the client device 110. As another example, the chatbot development platform can alternatively be implemented exclusively at the remote system 160, but the client device 110 can still enable the user to interact with the chatbot development platform.

The chatbot development platform can be utilized by a user (e.g., the user of the client device 110) to generate a chatbot as described herein to be deployed for conducting corresponding conversations on behalf of an entity, such as a third-party associated with the user of the client device 110 (e.g., via third-party system(s) 192). Notably, the chatbot development platform can be provided by a first-party, and the user can utilize the chatbot development platform to generate the chatbot for his or herself, or for the third-party associated with the user. As used herein, the term first-party refers to an entity that publishes the chatbot development platform, whereas the term third-party refers to an entity that is distinct from the entity associated with the first-party and did not publish the chatbot development system. Accordingly, the user of the client device 110 that interacts with the chatbot development platform may also be referred to as a third-party developer.

The corresponding conversations that are described herein as being conducted by the chatbot and on behalf of the entity may include various types of conversations, such as voice-based conversations and text-based conversations. The voice-based conversations can include, for example, corresponding conversations conducted during automated telephone calls (e.g., Voice over Internet Protocol (VoIP), public switched telephone networks (PSTN), and/or other telephonic communication protocols) and between the client device and additional client device(s) 191, corresponding conversations in which the chatbot engages with other entities and/or users locally at a given client device (e.g., in scenarios where the client device 110 is a shared client that is accessible by multiple users), and/or in any other voice-based scenario in which the chatbot is deployed to conduct the corresponding conversations with users. The text-based conversations can include, for example, corresponding conversations conducted during text or SMS messaging, email, and/or in any other text-based scenario in which the chatbot is deployed to conduct the corresponding conversations with users.

As noted above, the chatbot development platform may leverage the on-device ML model engine 140 and/or the remote system ML model engine 170 in processing the various user inputs received at the client device 110 and in generating the various outputs to be provided for presentation to the user at the client device 110 and/or additional users at respective additional client device(s) 191. Each of the sub-engines of the on-device ML model engine 140 and/or the remote system ML model engine 170 may be configured to perform one or more functions. Notably, the remote system ML model engine 170 includes remote based counterparts of the sub-engines of the on-device ML model engine 140. In various implementations, utilization of the on-device ML model engine 140 may be prioritized due at least in part to latency considerations, network bandwidth considerations, privacy considerations, and/or other considerations. In these implementations, the remote system ML model engine 170 may be utilized when one or more of the sub-engines of the on-device ML model engine 140 fail. In other implementations, utilization of the remote ML model engine 170 may be prioritized due at least in part to computational considerations at the client device 110, hardware considerations at the client device 110, software considerations at the client device 110, and/or other considerations. In yet other implementations, the on-device ML model engine 140 and the remote system ML model engine 170 may be utilized in conjunction with one another.

For example, the ASR engine 141 and/or 171 can process, using ASR model(s) stored in the respective ML model(s) databases (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 142 and/or 172 can process, using NLU model(s) stored in the respective ML model(s) databases (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 120 of the client device 110) to generate NLU output. Moreover, the fulfillment engine 143 and/or 173 can process, using fulfillment model(s) and/or fulfillment rules stored in the respective ML model(s) databases, the NLU data to generate fulfillment output. Additionally, the TTS engine 144 and/or 174 can process, using TTS model(s) stored in the respective ML model(s) databases, textual data (e.g., text formulated by a chatbot) to generate synthesized speech audio data that includes computer-generated synthesized speech corresponding to the textual data.

In various implementations, the ASR output can include, for example, a plurality of speech hypotheses (e.g., term hypotheses and/or transcription hypotheses) for spoken input based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) stored in the respective ML model databases are end-to-end speech recognition model(s), such that the ASR engine 141 and/or 171 can generate the plurality of speech hypotheses directly using the model. For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. In other implementations, the ASR model(s) are not end-to-end speech recognition model(s) such that the ASR engine 141 and/or 171 can instead generate predicted phoneme(s) (and/or other representations). For instance, the predicted phoneme(s) (and/or other representations) may then be utilized by the ASR engine 141 and/or 171 to determine a plurality of speech hypotheses that conform to the predicted phoneme(s). In doing so, the ASR engine 141 and/or 171 can optionally employ a decoding graph, a lexicon, and/or other resource(s). In various implementations, a corresponding transcription can be rendered at the client device 110 (e.g., in association with training instance input, training instance output, corresponding feature emphasis input(s), a demonstrative conversation, and/or other aspects of the chatbot development platform).

In various implementations, the NLU output can include, for example, annotated recognized text that includes one or more annotations of the recognized text for one or more (e.g., all) of the terms of the recognized text. For example, the NLU engine 142 and/or 172 may include a part of speech tagger (not depicted) configured to annotate terms with their grammatical roles. Additionally, or alternatively, the NLU engine 142 and/or 172 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person, particular place, etc.). The entity tagger may rely on content of the unstructured free-form natural language input to resolve a particular entity and/or may optionally communicate with a knowledge graph or other entity database to resolve a particular entity. Additionally, or alternatively, the NLU engine 142 and/or 172 may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine 142 and/or 172 may rely on annotations from one or more other components of the NLU engine 142 and/or 172. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data (e.g., stored in user data database 110A) of the user of the client device 110 in coreference resolution and/or entity resolution. The user data may include, for example, historical location data, historical temporal data, user preference data, user account data, calendar data, email data, and/or any other user data that is accessible at the client device 110.

In various implementations, the fulfillment output can include, for example, one or more tasks to be performed by a chatbot and on behalf of the user of the client device 110, on behalf of an entity associated with the user of the client device 110, and/or on behalf of additional users of respective additional client device(s) 191. As described in more detail herein (e.g., with respect to FIGS. 2, 3, 4, 5A, 5B, and 5C), the user of the client device 110 can provide unstructured free-form natural language input that implicitly and/or explicitly defines a corresponding dialog state map to be utilized by a chatbot in engaging in corresponding conversations with additional users (e.g., that are in addition to the user of the client device 110). The corresponding conversations with the additional users may require the chatbot to perform task(s) on behalf of the additional user(s) and/or on behalf of the entity. Notably, the unstructured free-form natural language input may implicitly define a corresponding dialog state map (e.g., as described with respect to FIG. 5A) or explicitly define a corresponding dialog state map (e.g., as described with respect to FIG. 5B) to be utilized by the chatbot in engaging in the corresponding conversations. Nonetheless, and through utilization of the chatbot development engine client 150 and/or the chatbot development engine 180, the chatbot can be generated and deployed to engage in the corresponding conversations in response to receiving the unstructured free-form natural language input. Accordingly, it should be understood that the fulfillment output may be dependent on the corresponding conversations.

In various implementations, the TTS engine 144 and/or 174 can generate synthesized speech audio data that captures computer-generated synthesized speech. The synthesized speech audio data can be rendered at the client device 110 via speaker(s) of the client device 110 and/or rendered at additional client device(s) 191 via respective speaker(s) of the additional client device(s) (e.g., client devices associated with the entities). The synthesized speech may include any output generated by the chatbot described herein, and may include, for example, synthesized speech generated as part of a dialog between the user of the client device 110 and the chatbot, synthesized speech generated as part of a dialog between entities (or additional users associated with the entities) and the chatbot, and/or other synthesized speech.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the remote system 160 (e.g., over the one or more networks 199). As another example, a given client device can be utilized by multiple users in a shared setting (e.g., a group of users, a household, etc.).

The chatbot development engine 180 may include, in various implementations, chatbot identification engine 181, chatbot fine-tuning engine 182, dialog state(s)/transition(s) engine 183, conversation engine 184, conversation context engine 185, responsive content engine 186, and peripheral behavior engine 187 as depicted in FIG. 1. Although the chatbot development engine 180 is depicted as having particular sub-engines, it should be understood that is for the sake of example and is not meant to be limiting. For example, one or more of the sub-engines depicted in FIG. 1 may be combined, while one or more other sub-engines depicted in FIG. 1 may be omitted. Further, although the chatbot development engine client 150 is not depicted as including any sub-engines, it should be understood that is for the sake of brevity and is not meant to be limiting. For example, the chatbot development engine client 150 may include the same sub-engines described with respect to the chatbot development engine 180 or a subset thereof. Additional description of the chatbot development engine 180 and its various sub-engines is provided with respect to FIG. 2.

Figure 2:
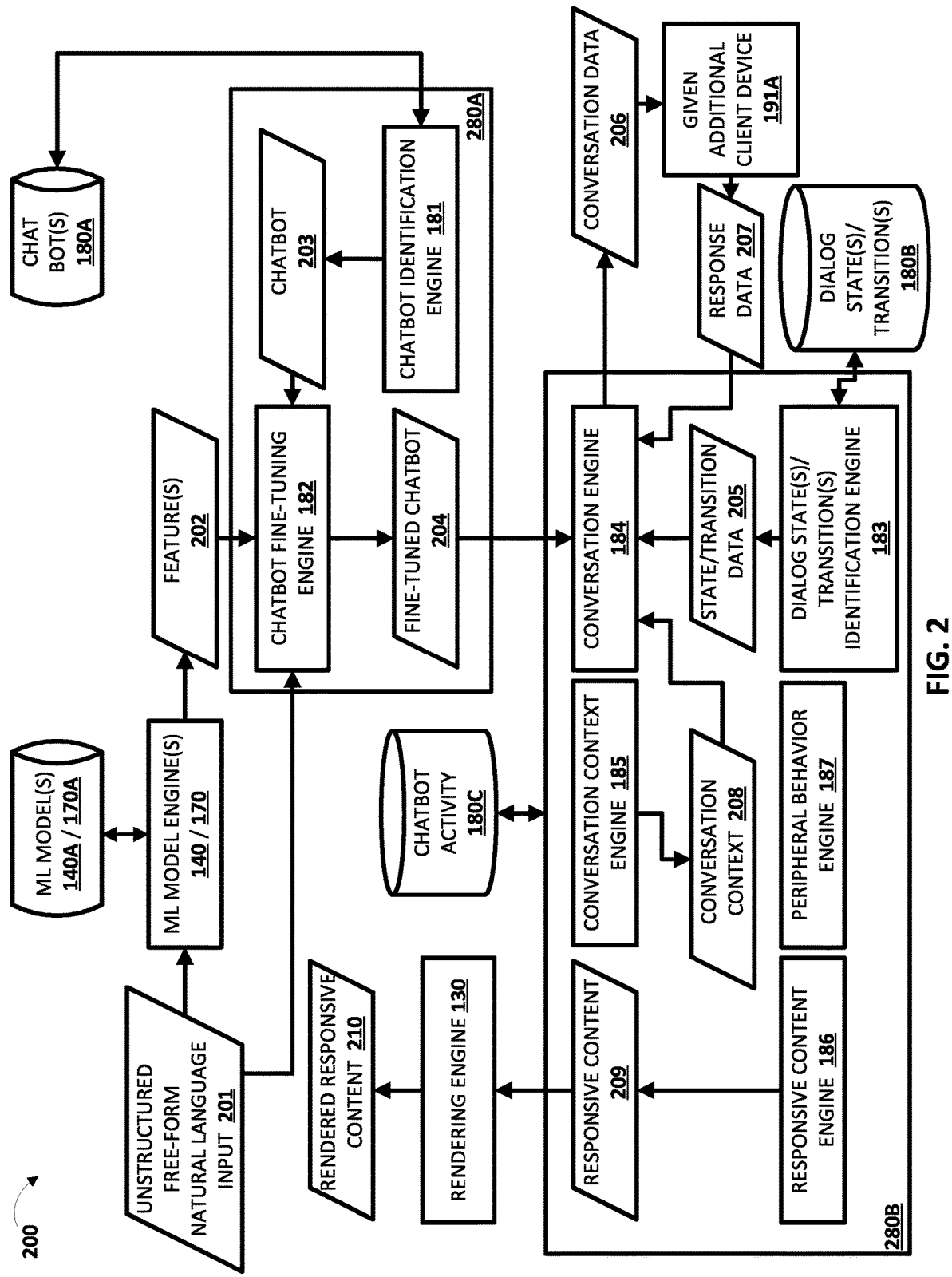
FIG. 2 depicts an example process flow for generating a chatbot and causing the chatbot to engage in corresponding conversation(s) with additional user(s), in accordance with various implementations.

Referring now to FIG. 2, an example process flow 200 for generating a chatbot and causing the chatbot to engage in corresponding conversation(s) with additional user(s) is depicted. For the sake of example, assume that the user of the client device 110 from FIG. 1 provides unstructured free-form natural language input 201 as input at the client device 110. The client device 110 may receive the unstructured free-form natural language input 201 via the user input engine 120 of the client device 110. The client device 110 can cause the unstructured free-form natural language input 201 to be processed using various sub-engines of the on-device ML model engine 140 and/or using various sub-engines of the remote ML model engine 170.

Notably, in processing the unstructured free-form natural language input 201, the client device 110 can identify one or more features 202 based on output generated by one or more of the various sub-engines of the on-device ML model engine 140 and/or one or more of the various sub-engines of the remote ML model engine 170. The one or more features 202 can include, for example, ASR output in instances where the unstructured free-form natural language input 201 is spoken input, NLU output in instances where the unstructured free-form natural language input 201 is spoken input or typed input, and/or fulfillment output in instances where the unstructured free-form natural language input 201 is spoken input or typed input, such as entities, intents, slot values, task(s) associated with the entities that are to be performed by a chatbot, and/or other features. The one or more features 202 may include features for a given portion of the unstructured free-form natural language input 201 or for multiple portions (e.g., two or more portions, or all portions) of the unstructured free-form natural language input 201.

For the sake of example, further assume that the unstructured free-form natural language input 201 is received from a user associated with "Ma & Pa Store"—a hypothetical goods store—and corresponds to a spoken utterance of "Tell everyone who calls our operating hours and our physical address, but that we are only accepting online orders at this time". In this example, the ASR output may be recognized text corresponding to the spoken utterance (e.g., recognized text of "Tell everyone who calls our operating hours and our physical address, but that we are only accepting online orders at this time"), NLU output may be a "provide content" intent that has a slot value of "[operating hours]" associated with an "operating hours" dialog state, a slot value of "[physical address]" associated with a "physical address" dialog state, and a slot value of "we are only accepting online orders at this time" associated with an "additional information" dialog state. Notably, the one or more features 202 in this example include corresponding dialog states, and corresponding dialog state transitions may be inferred based on the unstructured free-form natural language input 201. Accordingly, in some of these example and in response to receiving the unstructured free-form natural language input 201, a chatbot that is configured to answer any incoming telephone calls directed to "Ma & Pa Store" can be generated during a training phase (e.g., encompassed by box 280A in FIG. 2).

During the training phase, the chatbot identification engine 181 can identify a chatbot 203 (e.g., stored in chatbot(s) database 180A). The chatbot 203 may be a previously trained ML model or combination of various previously trained ML models that can be fine-tuned based on the unstructured free-form natural language input 201 and/or the one or more features 202 extracted from the unstructured free-form natural language input 201. For example, the chatbot 203 may correspond to a previously trained large language model (LLM), such as LaMDA, BERT, Meena, GPT-3, and/or another previously trained LLM. Notably, these previously trained LLMs have been previously trained on enormous amounts of diverse data (e.g., thousands of hours) and are typically generative ML models that are capable of engaging in corresponding conversations with users in a more natural and intuitive manner. These LLMs have a plurality of ML layers and hundreds of millions to hundreds of billions of ML parameters, and are capable of generalizing the corresponding conversations with users.

For example, and as described in more detail herein (e.g., with respect to FIGS. 5A, 5B, and 5C), textual data may be provided as input across these previously trained LLMs to generate LLM output, such as a probability distribution over a vocabulary, and a response to the textual data may be generated based on the probability distribution over the vocabulary. Due to the plurality of ML layers and hundreds of millions to hundreds of billions of ML parameters, it should be noted that LLMs are typically not conducive to being implemented locally at the client device 110, such as when the chatbot(s) database 180A is local to the client device 110 (e.g., stored in on-device storage of the client device 110). Nonetheless, various sparsification techniques may be utilized to reduce the amount of ML layers and/or the amount of ML parameters utilized by these LLMs such that a sparsified version a previously trained LLM may be implemented locally at the client device 110 while mitigating reduction in precision and/or recall of the previously trained LLM due to the sparsification. These sparsification techniques may include, but are not limited to, collapsing and/or combining multiple layers of the plurality of ML layers of the previously trained LLM, pruning multiple layers of the plurality of ML layers of the previously trained LLM, masking weights of the previously trained LLM, pruning weights of the previously trained LLM, and/or other sparsification techniques. However, when the chatbot(s) database 180A is remote from the client device 110 (e.g., stored in remote storage of the remote system 160), an unsparsified version of a previously trained LLM may be implemented remotely at the remote system 160. Accordingly, the chatbot 203 may be identified locally at the client device 110 and/or remotely at the remote system 160 (e.g., remote from the client device 110 that received the unstructured free-form natural language input 201).

Further, during the training phase, the chatbot fine-tuning engine 182 may utilize various fine-tuning techniques to generate a fine-tuned chatbot 204 by fine-tuning the chatbot 203 and based on the unstructured free-form natural language input 201 and/or the one or more features 202 extracted from the unstructured free-form natural language input 201 (and the fine-tuned chatbot 204 may optionally be stored in the chatbot(s) database 180A). These fine-tuning techniques may include, but are not limited to, instruction tuning, few-shot learning, and/or other fine-tuning techniques, and the fine-tuning performed may vary based on the unstructured free-form natural language input 201 provided by the user. Put another way, the previously trained LLM that corresponds to the chatbot 203 may be further trained based on the unstructured free-form natural language input 201 and/or the one or more features 202 extracted from the unstructured free-form natural language input 201, such that the previously trained LLM that is fine-tuned and corresponds to the fine-tuned chatbot 204 is adapted to engage in the corresponding conversations on behalf of the user. By fine-tuning the chatbot 203, the resulting fine-tuned chatbot 204 leverages the generalization capabilities of the previously trained LLM while also being adapted to engage in the corresponding conversations on behalf of the entity. Accordingly, the chatbot 203 may be fine-tuned to generate the fine-tuned chatbot 204 locally at the client device 110 and/or remotely at the remote system 160 (e.g., remote from the client device 110 that received the unstructured free-form natural language input 201). The fine-tuned chatbot 204 may be subsequently utilized by the client device 110 and/or the remote system 160 during an inference phase (e.g., encompassed by box 280B in FIG. 2).

Although FIG. 2 is described with respect to fine-tuning the chatbot 203 based on the unstructured free-form natural language input 201 and/or the one or more features 202 of the unstructured free-form natural language input 201 to generate the fine-tuned chatbot 204, it should be understood that is only one implementation contemplated herein. For example, in other implementations, the chatbot 203 may not be fine-tuned such that the chatbot 203 may be subsequently utilized by the client device 110 and/or the remote system 160 during an inference phase (e.g., encompassed by box 280B in FIG. 2).

During the inference phase, the dialog state(s)/transition(s) identification engine 183 may determine state/transition data 205 to be utilized by the chatbot in engaging in a given corresponding conversation with a given additional user. Continuing with the above example where the unstructured free-form natural language input 201 is the spoken utterance of "Tell everyone who calls our operating hours and our physical address, but that we are only accepting online orders at this time", the state/transition data 205 may include, for instance, an indication to generate and provide an instance of synthesized speech audio data for presentation to the given user based on the "operating hours" dialog state, the "physical address" dialog state, the "additional information" dialog state, and/or other dialog states. In various implementations, information about the dialog state(s)/transition(s) may be stored in dialog state(s)/transition(s) database 180B and/or other data sources. For instance, the operating hours of "Ma & Pa Store", the physical address of "Ma & Pa Store", and the additional information that "we are only accepting online orders at this time" may be stored in the dialog state(s)/transition(s) database 180B and in association with respective dialog state(s). Although the state/transition data 205 is described as including particular data, it should be understood that is for the sake of example and is not meant to be limiting. For instance, the state/transition data 205 may include any data related to any dialog states and/or transitions therebetween that is implicitly and/or explicitly provided by the user of the client device 110 in the unstructured free-form natural language input 201.

Notably, in engaging in the corresponding conversations, the chatbot may answer incoming electronic communications on behalf of the entity (including incoming voice-based communications, such as incoming phone calls, and incoming text-based communications, such as incoming emails and incoming text messages) and initiate outgoing electronic communications on behalf of the entity (including outgoing voice-based communications, such as outgoing phone calls, and outgoing text-based communications, such as outgoing emails and outgoing text messages). Further, the dialog state(s)/transition(s) identification engine 183 can provide the state/transition data 205 to the conversation engine 184 to enable the fine-tuned chatbot 204 (or simply the chatbot 203) to engage in the corresponding conversations. For instance, the conversation engine 184 can process at least the state/transition data 205 to generate conversation data 206, such as instance(s) of synthesized speech audio data and/or instance(s) of textual data that can be rendered at a given additional client device 191A of a given additional user.

In various implementations, response data 207 that is received during the corresponding conversations may also be utilized in generating the conversation data 206. The response data 207 may include responses or other input initially provided by the given additional user when the given corresponding conversation is initiated, or other responses provided by the given additional user in response to the instance(s) of synthesized speech audio data and/or instance(s) of textual data. In various implementations, the conversation context engine 185 may provide conversation context data 208 to the conversation engine 184 and to enable the fine-tuned chatbot 204 (or simply the chatbot 203) to engage in a more contextualized corresponding conversation with the given additional user. In these implementations, the conversation context data 208 may represent (e.g., as a vector or other data structure) initial contextual information for the corresponding conversation or subsequent contextual information that is determined during the corresponding conversation (e.g., determined based on data stored in chatbot activity database 180C).

Continuing with the above example where the unstructured free-form natural language input 201 is the spoken utterance of "Tell everyone who calls our operating hours and our physical address, but that we are only accepting online orders at this time", the conversation context engine 185 may generate conversation context data 208 that indicates "Hello, thanks for calling Ma & Pa Store", information associated with the operating hours of "Ma & Pa Store", information associated with the physical address of "Ma & Pa Store", information that indicates "Ma & Pa Store" is only accepting online orders, and/or other contextual information that may be inferred based on the unstructured free-form natural language input 201.

Further, during the inference phase and in implementations where the chatbot corresponds to the fine-tuned chatbot 204, the conversation engine 184 can initially process, using the fine-tuned chatbot 204 (e.g., and not the chatbot 203), the state/transition data 205 (and optionally any response data 207 and/or conversation context data 208) to generate output, such as a probability distribution over a sequence of words or phrases. The conversation engine 184 can generate conversation data 206 based on the output generated using the fine-tuned chatbot 204. The conversation data 206 can include, for example, the instance(s) of synthesized speech audio data in implementations where the corresponding conversation is a voice-based conversation, the instance(s) of textual data in implementations where the corresponding conversation is a text-based conversation. In various implementations, and as depicted in FIG. 2, the conversation data 206 can be transmitted to the given additional client device 191A to cause the conversation data 206 to be rendered audibly and/or visually at the given additional client device 191A. However, in other implementations, such as when the fine-tuned chatbot 204 engages in the corresponding conversation locally at the client device 110 (e.g., when the client device 110 is deployed in a shared setting), the conversation data 206 may be rendered audibly and/or visually at the client device 110.

Alternatively, during the inference phase and in implementations where the chatbot corresponds to the chatbot 203 (e.g., and not the fine-tuned chatbot 204), the conversation engine 184 can initially process, using the chatbot 204, the unstructured free-form natural language input 201, the one or more features 202 determined based on processing the unstructured free-form natural language input 201, state/transition data 205 (and optionally any response data 207 and/or conversation context data 208) to generate output, such as a probability distribution over a sequence of words or phrases. The conversation engine 184 can generate conversation data 206 based on the output generated using the chatbot 203. The conversation data 206 can include, for example, the instance(s) of synthesized speech audio data in implementations where the corresponding conversation is a voice-based conversation, the instance(s) of textual data in implementations where the corresponding conversation is a text-based conversation. In various implementations, and as depicted in FIG. 2, the conversation data 206 can be transmitted to the given additional client device 191A to cause the conversation data 206 to be rendered audibly and/or visually at the given additional client device 191A. However, in other implementations, such as when the chatbot 203 engages in the corresponding conversation locally at the client device 110 (e.g., when the client device 110 is deployed in a shared setting), the conversation data 206 may be rendered audibly and/or visually at the client device 110. Put another way, rather than fine-tuning the chatbot 203 during the training phase, the chatbot 203 can be primed during the inference phase based on the unstructured free-form natural language input 201 and/or the one or more features 202 determined based on processing the unstructured free-form natural language input 201. This enables the client device 110 and/or the remote system 160 to conserve computational resources while still effectively deploying the chatbot to engage in the corresponding conversations.

Moreover, during the inference phase, the responsive content engine 186 can cause audio data and/or textual data captured in the response data 207 to be processed (e.g., input parsing using ASR model(s), NLU model(s), and/or fulfillment rules) to determine that the given additional user provided responses to the instance(s) of synthesized speech audio data and/or the instance(s) of textual data. Put another way, the responsive content engine 186 can determine responsive content 209 based on the corresponding conversation, such as a result of the corresponding conversation and/or a summary of the corresponding conversation. For instance, the responsive content engine 186 can provide the responsive content 209 to the rendering engine 130 to cause the client device to audibly and/or visually provide rendered responsive content 210 for presentation to the user. Accordingly, implementations described herein enable the user to provide the unstructured free-form natural language input 201 to cause the chatbot 203 or the fine-tuned chatbot 204 to be generated and utilized in engaging in the corresponding conversations based on the unstructured free-form natural language input 201.

As described in more detail herein (e.g., with respect to FIG. 5C), the chatbot 203 and the fine-tuned chatbot 204 may have various peripheral behaviors that may be implemented by the chatbot 203 or the fine-tuned chatbot 204 through utilization of the peripheral behavior engine 187. These peripheral behaviors can include, but are not limited to, greetings behaviors that enable the fine-tuned chatbot 204 to identify the user of the client device 110 and/or to identify itself as a chatbot, remote procedure call (RPC) behaviors that enable the chatbot 203 or the fine-tuned chatbot 204 to search one or more databases during the corresponding conversations, on hold behaviors that enable the chatbot 203 or the fine-tuned chatbot 204 to pause and resume the corresponding conversations, bailout behaviors that enable the chatbot 203 or the fine-tuned chatbot 204 to prompt the user of the client device 110 to join the corresponding conversation when requested by the given additional user and/or otherwise terminate the corresponding conversation, clarification behaviors that enable the chatbot 203 or the fine-tuned chatbot 204 to clarify and/or repeat information that was previously provided during the corresponding conversations, and/or other peripheral behaviors that may invoked by the chatbot 203 or the fine-tuned chatbot 204 when corresponding conditions for invoking those other peripheral behaviors.

Although FIG. 2 is described with respect to the corresponding conversation being a phone call between the chatbot 203 or the fine-tuned chatbot 204 (e.g., being implemented locally at the client device 110 and/or remotely at the remote system 160) and the given additional user (e.g., being accessible at the given additional client device 191A), it should be understood that is not meant to be limiting. Rather, it should be understood that the techniques described herein may be utilized to fine-tune a chatbot that can be deployed for engaging in voice-based conversations and/or text-based conversations that are conducted across multiple computing devices and/or at a single computing device.

Figure 3:
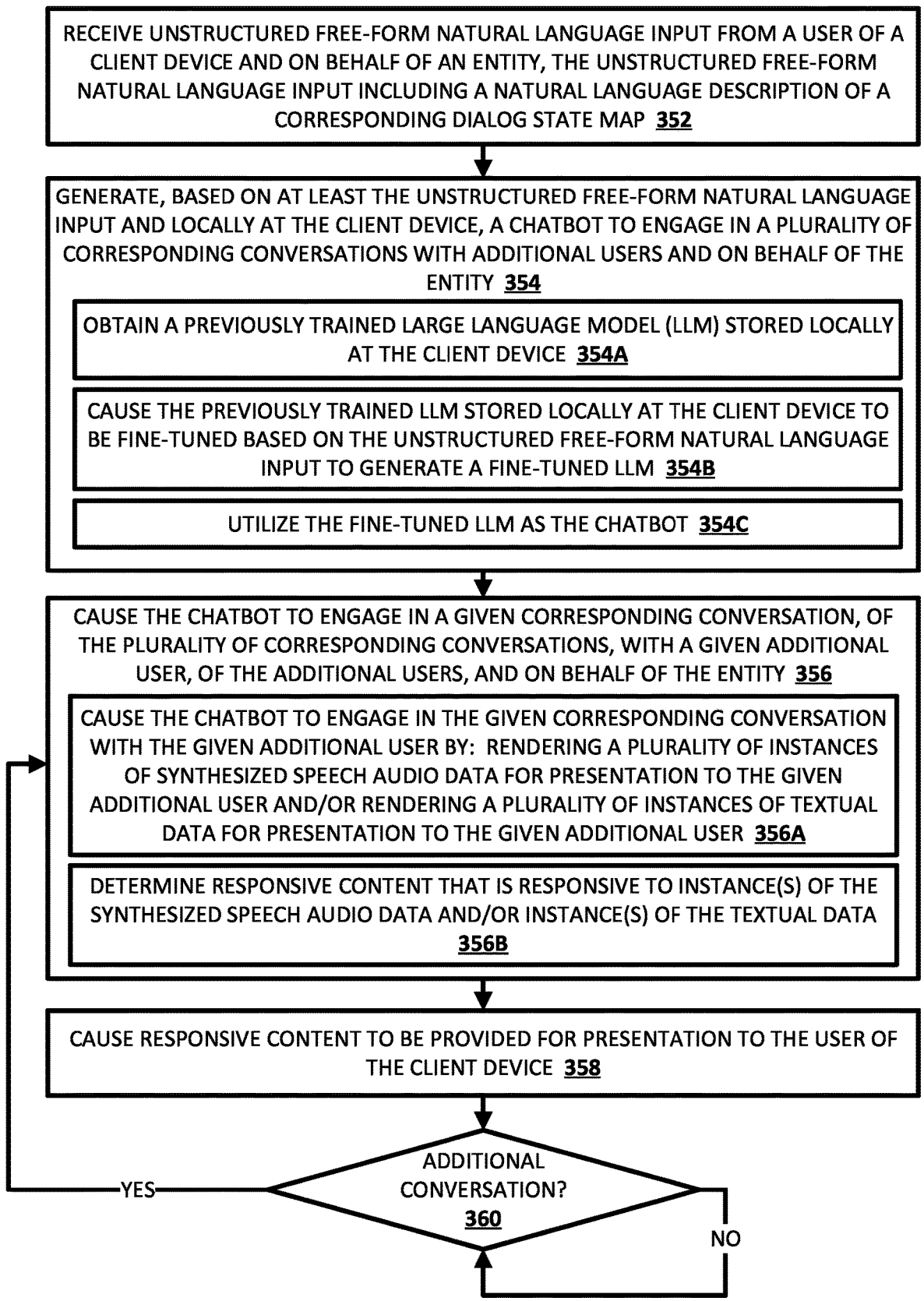
FIG. 3 depicts a flowchart illustrating an example method of generating a chatbot locally at a client device and causing the chatbot to engage in corresponding conversation(s) with additional user(s), in accordance with various implementations.

Turning now to FIG. 3, a flowchart illustrating an example method 300 of generating a chatbot locally at a client device and causing the chatbot to engage in corresponding conversation(s) with additional user(s) is depicted. For convenience, the operations of the method 300 are described with reference to a system that performs the operations. This system of the method 300 includes at least one processor, memory, and/or other component(s) of client device(s) (e.g., client device 110 of FIG. 1, computing device 610 of FIG. 6, and/or other client devices). Moreover, while operations of the method 300 are shown in a particular order, this is not meant to be limiting. One or more operations may be reordered, omitted, and/or added.

At block 352, the system receives unstructured free-form natural language input from a user of a client device and on behalf of an entity, the unstructured free-form natural language input including a natural language description of a corresponding dialog state map. The unstructured free-form natural language input received from the user of the client device may include, for example, spoken input received via microphone(s) of the client device, typed input received via a touch sensitive display of the client device, and/or touch input received view the touch sensitive display of the client device. Notably, the unstructured free-form natural language input is unstructured in the sense that the user need not provide the free-form natural language input according to any schema or particular manner. However, the subsequent generation of the chatbot can be considered structured since the unstructured free-form natural language input implicitly and/or explicitly includes the natural language description of the corresponding dialog state map. As described in more detail herein (e.g., with respect to FIGS. 5A and 5B), the corresponding dialog state map can implicitly and/or explicitly include corresponding dialog states and corresponding dialog state transitions between the corresponding dialog states as the corresponding dialog state map.

At block 354, the system generates, based on at least the unstructured free-form natural language input and locally at the client device, a chatbot to engage in a plurality of corresponding conversations with additional users and on behalf of the entity. In some implementations, and as indicated at block 354A, the system obtains a previously trained large language model (LLM) stored locally at the client device. Further, in these implementations, and as indicated at block 354B, the system causes the previously trained LLM stored locally at the client device to be fine-tuned based on the unstructured free-form natural language input to generate a fine-tuned LLM. Moreover, in these implementations, and as indicated at block 354C, the system utilizes the fine-tuned LLM as the chatbot. The system can generate the chatbot to engage in the plurality of corresponding conversations with the plurality of additional users and on behalf of the entity in the same or similar described above with respect to FIG. 2 (e.g., in implementations where the training phase is implemented locally at the client device and described with respect to the box 280A). Notably, in these implementations, the system is being implemented at locally at the client device, and, as a result, the previously trained LLM may be a sparsified version of a previously trained LLM that may otherwise be available (e.g., otherwise available to a remote system) due to various hardware and/or software constraints of the client device.

At block 356, the system causes the chatbot to engage in a given corresponding conversation, of the plurality of corresponding conversations, with a given additional user, of the additional users, and on behalf of the entity. In some implementations, and as indicated at block 356A, the system causes the chatbot to engage in the given corresponding conversation with the given additional user by: rendering a plurality of instances of synthesized speech audio data for presentation to the given additional user and/or rendering a plurality of instances of textual data for presentation to the given additional user. Further, in these implementations, and as indicated at block 356B, the system determines responsive content that is responsive to one or more of the instances of synthesized speech audio data and/or one or more of the instances of the textual data. The system can cause the chatbot to engage in the given corresponding conversation with the given additional user and on behalf of the user in the same or similar described above with respect to FIG. 2 (e.g., in implementations where the inference phase is implemented locally at the client device and described with respect to the box 280B) and with respect to FIGS. 5A, 5B, and 5C. Notably, in implementations where the system implements the chatbot locally at the client device, the given corresponding conversation can be conducted between the chatbot via the client device and the given additional user via a given additional client device.

At block 358, the system causes responsive content to be provided for presentation to the user of the client device. The responsive content may be determined based on, for example, one or more responses provided by the given additional user during the given corresponding conversation (e.g., as described with respect to FIG. 5C). The responsive content may include, for example, a summary of the given corresponding conversation, a result of the given corresponding conversation, and/or any other content that may be determined based on the chatbot engaging in the given corresponding conversation with the given additional user. However, it should be noted that the responsive content may be dependent on spoken inputs provided by the given additional user during the given corresponding conversation.

At block 360, the system determines whether to cause the chatbot to engage in a given additional corresponding conversation, of the plurality of corresponding conversations, with a given further additional user, of the additional users, and on behalf of the entity. The system may determine whether to cause the chatbot to engage in the given additional corresponding conversation with the given further additional user and on behalf of the entity based on, for example, whether there is an incoming electronic communication directed to the entity (e.g., an incoming voice-based communication such as an incoming telephone call directed to the entity, an incoming text-based communication such as an incoming email message, etc.), whether the system is tasked with initiating an outgoing electronic communication on behalf of the entity (e.g., an outgoing voice based communication such as an outgoing telephone call, an outgoing text-based communication such as an outgoing email message or text message, etc.), whether the system is returning a previously missed or ignored incoming electronic communication, and/or based on other considerations.

If, at an iteration of block 360, the system determines to cause the chatbot to engage in the given additional corresponding conversation with the given further additional user and on behalf of the entity, the system may return to block 356 and continue with an additional iteration of the method 300 with respect to the given additional corresponding conversation and the given further additional user. If, at an iteration of block 360, the system determines not to cause the chatbot to engage in the given additional corresponding conversation with the given further additional user and on behalf of the entity, then the system may continue monitoring for whether to cause the chatbot to engage in the given additional corresponding conversation with the given further additional user and on behalf of the entity.

Although the method 300 of FIG. 3 is described with respect to the chatbot being a previously trained LLM that is fine-tuned based on the unstructured free-form natural language input (e.g., at block 354), it should be understood that is for the sake of example and is not meant to be limiting. In additional or alternative implementations, the previously trained LLM may be utilized as the chatbot without any fine-tuning. In these implementations, and in causing the chatbot to engage in the given corresponding conversation with the given additional users (e.g., at block 356), the system can prime the previously trained LLM based on the unstructured free-form natural language input. This enables the chatbot to engage in the corresponding conversation without any explicit fine-tuning during a training phase.

Further, although the operations of block 360 are depicted as occurring subsequent to the system causing the chatbot to engage in the given corresponding conversation with the given additional entity (e.g., in a serial manner), it should be understood that is for the sake of example and is not meant to be limiting. For example, one or more iterations of the operations of block 360 may be continually performed as part of the method 300 of FIG. 3. This enables the system to cause the chatbot to engage in multiple conversations at any given instance of time (e.g., in a parallel manner). In these implementations, the system may implement multiple instances of the chatbot or utilize a single instance of the chatbot. Further, although FIG. 3 is described with respect to the system being implemented locally at the client device of the user, it should be understood that is for the sake of example, and is not meant to be limiting. For example, and as described with respect to FIG. 4, the system may be implemented by a remote system that is remote from the client device of the user who provided the unstructured free-form natural language input.

Figure 4:
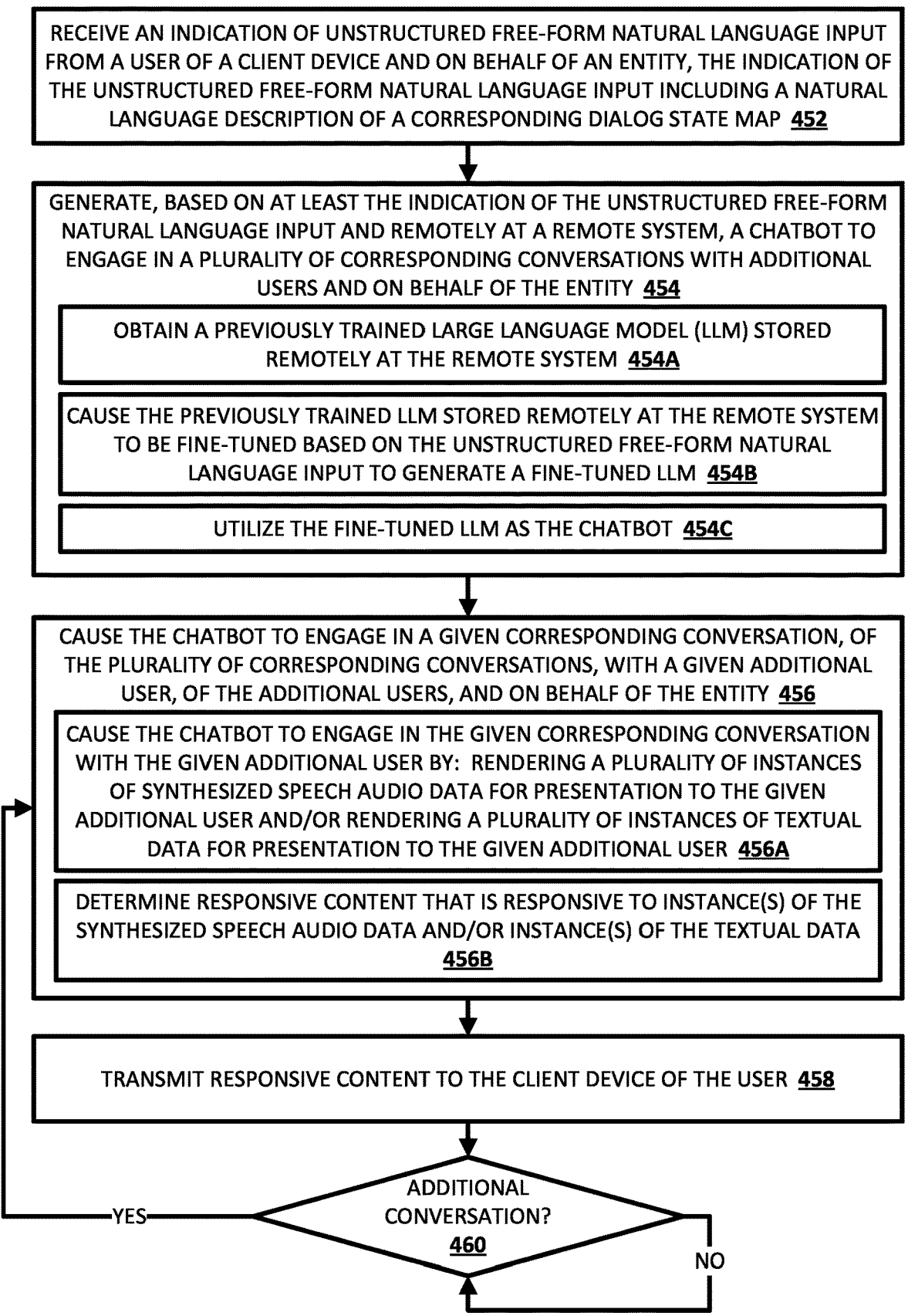
FIG. 4 depicts a flowchart illustrating an example method of generating a chatbot remotely at a remote system and causing the chatbot to engage in corresponding conversation(s) with additional user(s), in accordance with various implementations.

Turning now to FIG. 4, a flowchart illustrating an example method 400 of generating a chatbot remotely at a remote system and causing the chatbot to engage in corresponding conversation(s) with additional user(s) is depicted. For convenience, the operations of the method 400 are described with reference to a system that performs the operations. This system of the method 400 includes at least one processor, memory, and/or other component(s) of remote system(s) (e.g., remote system 160 of FIG. 1, computing device 610 of FIG. 6, and/or other remote systems). Moreover, while operations of the method 400 are shown in a particular order, this is not meant to be limiting. One or more operations may be reordered, omitted, and/or added.

At block 452, the system receives an indication of unstructured free-form natural language input from a user of a client device and on behalf of an entity, the indication of the unstructured free-form natural language input including a natural language description of a corresponding dialog state map. The indication of the unstructured free-form natural language input received from the user of the client device may include, for example, an indication of spoken input that was received via microphone(s) of the client device, an indication of typed input that was received via a touch sensitive display of the client device, and/or an indication of touch input that was received view the touch sensitive display of the client device. Again, the unstructured free-form natural language input is unstructured in the sense that the user need not provide the free-form natural language input according to any schema or particular manner. However, the subsequent generation of the chatbot can be considered structured since the unstructured free-form natural language input implicitly and/or explicitly includes the natural language description of the corresponding dialog state map.

At block 454, the system generates, based on at least the indication of the unstructured free-form natural language input and remotely at a remote system (e.g., that is remote from the client device), a chatbot to engage in a plurality of corresponding conversations with additional user and on behalf of the entity. In some implementations, and as indicated at block 454A, the system obtains a previously trained large language model (LLM) stored remotely at the remote system. Further, in these implementations, and as indicated at block 454B, the system causes the previously trained LLM stored remotely at the remote system to be fine-tuned based on the indication of the unstructured free-form natural language input to generate a fine-tuned LLM. Moreover, in these implementations, and as indicated at block 454C, the system utilizes the fine-tuned LLM as the chatbot. The system can generate the chatbot to engage in the plurality of corresponding conversations with the plurality of additional users and on behalf of the entity in the same or similar described above with respect to FIG. 2 (e.g., in implementations where the training phase is implemented remotely at the remote system and described with respect to the box 280A). Notably, in these implementations, the system is being implemented remotely at the remote system, and, as a result, the previously trained LLM may be an unsparsified version of a previously trained LLM that is more robust than a sparsified version of the previously trained LLM due to virtually no hardware and/or software constraints at the remote system.

At block 456, the system causes the chatbot to engage in a given corresponding conversation, of the plurality of corresponding conversations, with a given additional user, of the additional users, and on behalf of the entity. In some implementations, and as indicated at block 456A, the system causes the chatbot to engage in the given corresponding conversation with the given additional user by: rendering a plurality of instances of synthesized speech audio data for presentation to the given additional user and/or rendering a plurality of instances of textual data for presentation to the given additional user. Further, in these implementations, and as indicated at block 456B, the system determines responsive content that is responsive to one or more of the instances of synthesized speech audio data and/or one or more of the instances of the textual data. The system can cause the chatbot to engage in the given corresponding conversation with the given additional user and on behalf of the user in the same or similar described above with respect to FIG. 2 (e.g., in implementations where the inference phase is implemented locally at the client device and described with respect to the box 280B) and with respect to FIGS. 5A, 5B, and 5C. Notably, in implementations where the system implements the chatbot remotely at the remote system, the given corresponding conversation can be conducted between the chatbot via the remote system and the given additional user via a given additional client device.

At block 458, the system causes responsive content to be provided for presentation to the user of the client device. The responsive content may be determined based on, for example, one or more responses provided by the given additional user during the given corresponding conversation (e.g., as described with respect to FIG. 5C). The responsive content may include, for example, a summary of the given corresponding conversation, a result of the given corresponding conversation, and/or any other content that may be determined based on the chatbot engaging in the given corresponding conversation with the given additional user. However, it should be noted that the responsive content may be dependent on spoken inputs provided by the given additional user during the given corresponding conversation.

At block 460, the system determines whether to cause the chatbot to engage in a given additional corresponding conversation, of the plurality of corresponding conversations, with a given further additional user, of the additional users, and on behalf of the entity. The system may determine whether to cause the chatbot to engage in the given additional corresponding conversation with the given further additional user and on behalf of the entity based on, for example, whether there is an incoming electronic communication directed to the entity (e.g., an incoming voice-based communication such as an incoming telephone call directed to the entity, an incoming text-based communication such as an incoming email message, etc.), whether the system is tasked with initiating an outgoing electronic communication on behalf of the entity (e.g., an outgoing voice based communication such as an outgoing telephone call, an outgoing text-based communication such as an outgoing email message or text message, etc.), whether the system is returning a previously missed or ignored incoming electronic communication, and/or based on other considerations.

If, at an iteration of block 460, the system determines to cause the chatbot to engage in the given additional corresponding conversation with the given further additional user and on behalf of the entity, the system may return to block 456 and continue with an additional iteration of the method 400 with respect to the given additional corresponding conversation and the given further additional user. If, at an iteration of block 460, the system determines not to cause the chatbot to engage in the given additional corresponding conversation with the given further additional user and on behalf of the entity, then the system may continue monitoring for whether to cause the chatbot to engage in the given additional corresponding conversation with the given further additional user and on behalf of the entity.

Although the method 400 of FIG. 4 is also described with respect to the chatbot being a previously trained LLM that is fine-tuned based on the unstructured free-form natural language input (e.g., at block 454), it should be understood that is for the sake of example and is not meant to be limiting. In additional or alternative implementations, the previously trained LLM may be utilized as the chatbot without any fine-tuning. In these implementations, and in causing the chatbot to engage in the given corresponding conversation with the given additional users (e.g., at block 456), the system can prime the previously trained LLM based on the unstructured free-form natural language input. This enables the chatbot to engage in the corresponding conversation without any explicit fine-tuning during a training phase.

Further, although the operations of block 460 are depicted as occurring subsequent to the system causing the chatbot to engage in the given corresponding conversation with the given additional entity (e.g., in a serial manner), it should be understood that is for the sake of example and is not meant to be limiting. For example, one or more iterations of the operations of block 460 may be continually performed as part of the method 400 of FIG. 4. This enables the system to cause the chatbot to engage in multiple conversations at any given instance of time (e.g., in a parallel manner). In these implementations, the system may implement multiple instances of the chatbot or utilize a single instance of the chatbot. Further, although FIG. 4 is described with respect to the system being implemented locally at the client device of the user, it should be understood that is for the sake of example, and is not meant to be limiting.

Figure 5A:
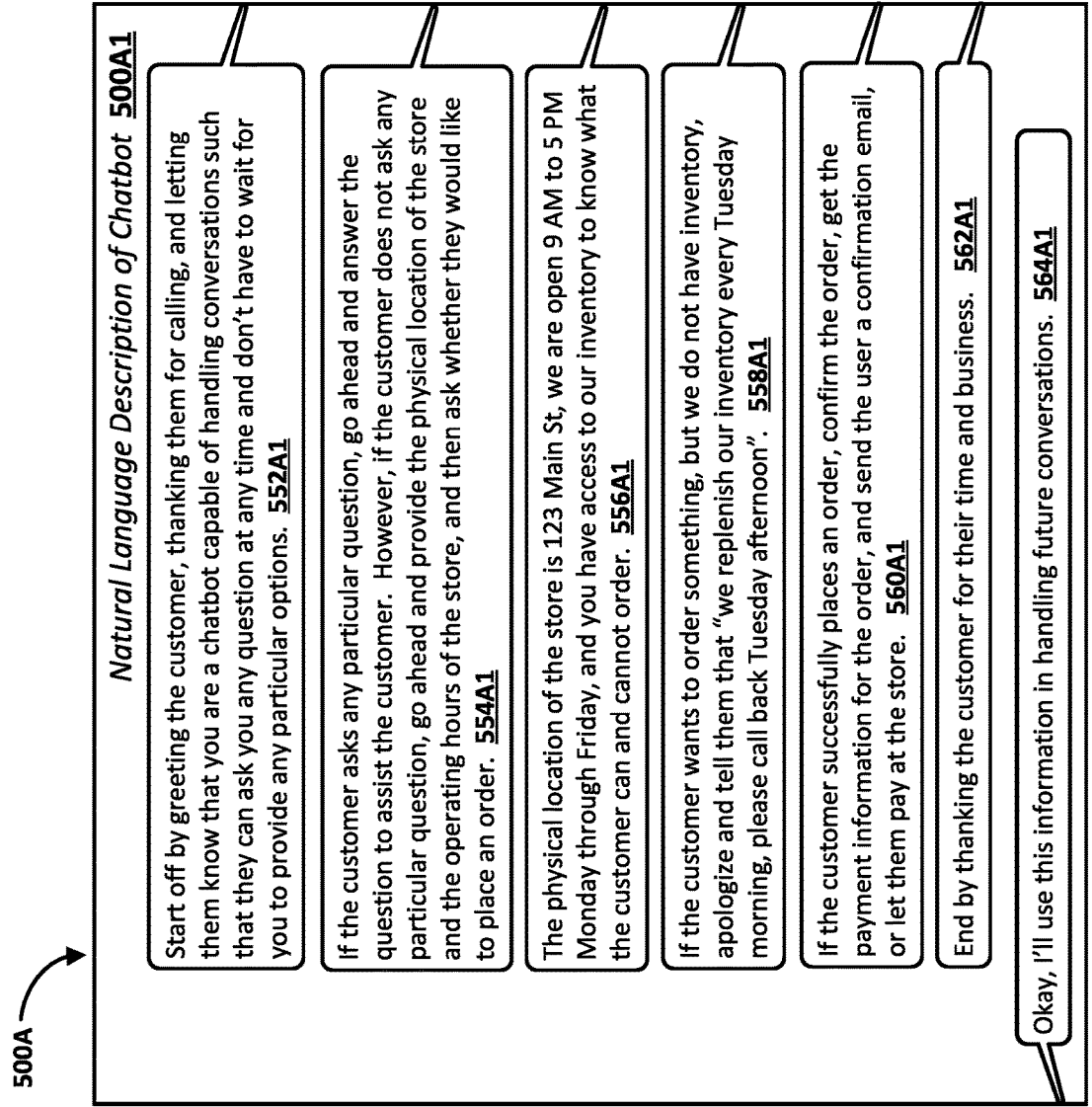
FIG. 5A, FIG. 5B, and FIG. 5C depict various non-limiting example interactions of corresponding unstructured free-form natural language input being utilized to generate a corresponding chatbot, and the corresponding chatbot engaging in corresponding conversation(s) with additional user(s) based on the corresponding unstructured free-form natural language input, in accordance with various implementations.
Figure 5B:
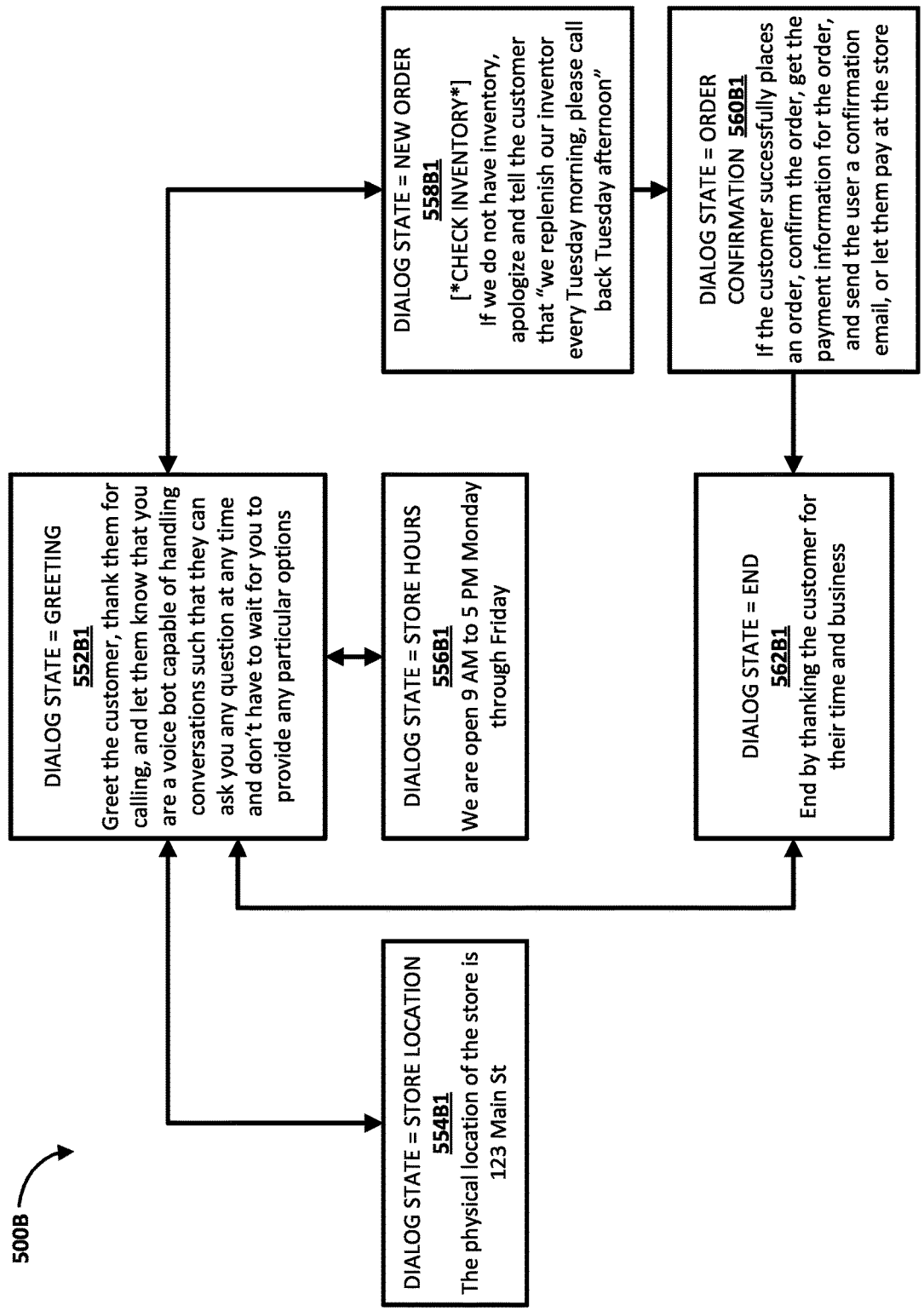
Figure 5C:
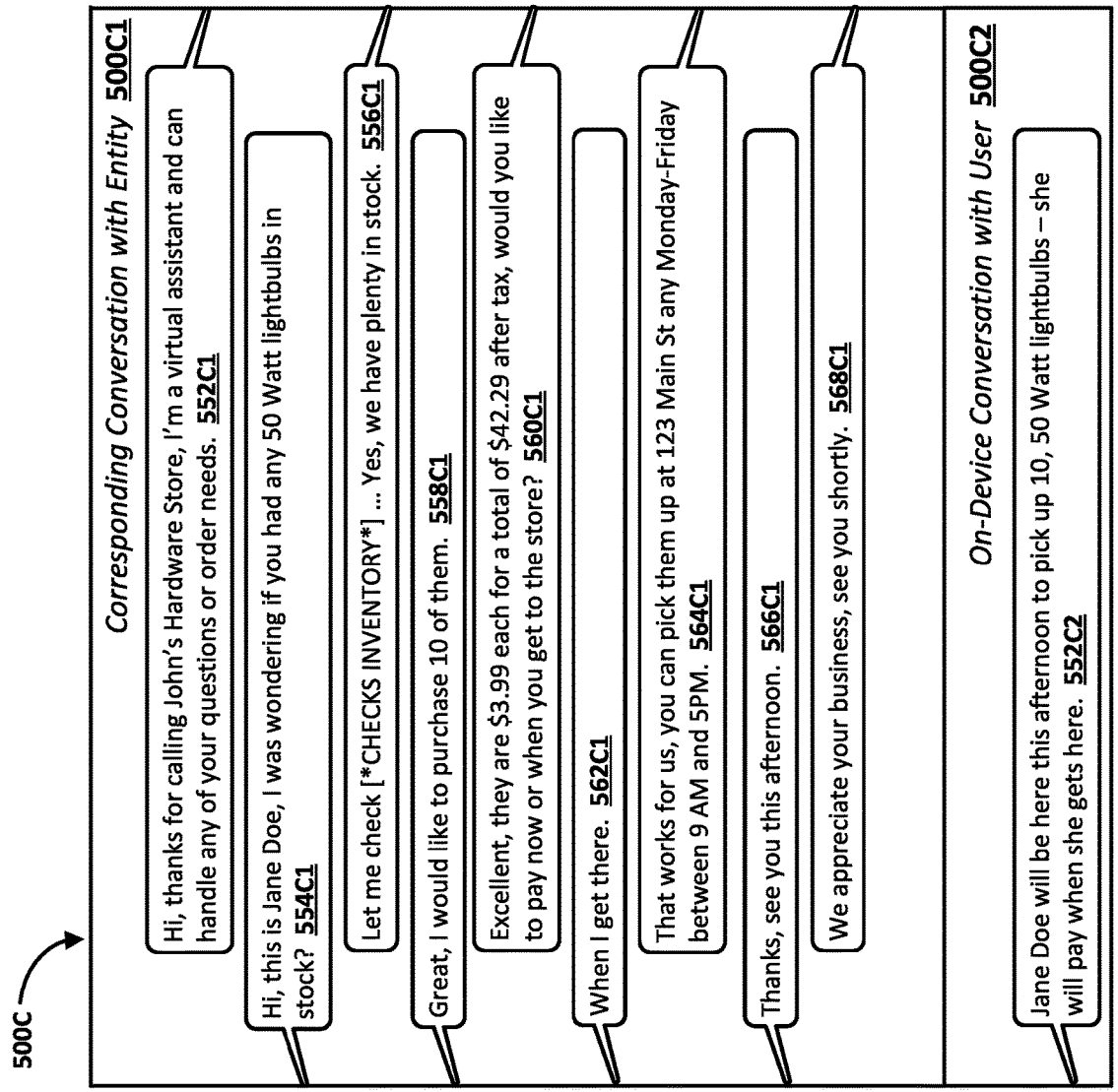

Turning now to FIGS. 5A, 5B, and 5C, various non-limiting example interactions of corresponding unstructured free-form natural language input being utilized to generate a corresponding chatbot, and the corresponding chatbot engaging in corresponding conversation(s) with additional user(s) based on the corresponding unstructured free-form natural language input are depicted. Notably, interactions 500A, 500B, and 500C described with respect to FIGS. 5A, 5B, and 5C, respectively, may be implemented across multiple computing devices to cause the chatbot to engage in the corresponding conversations. For example, the corresponding unstructured free-form natural language input described with respect to the examples of FIGS. 5A and 5B may be received at a client device of a user (e.g., the client device 110 of FIG. 1), the chatbot described with respect to the examples of FIGS. 5A, 5B, and 5C may be generated at the client device of the user (e.g., the client device 110 of FIG. 1) and/or at a remote system (e.g., the remote system 160 from FIG. 1), the chatbot described with respect to the examples of FIGS. 5A, 5B, and 5C may be implemented at the client device of the user (e.g., the client device 110 of FIG. 1) and/or at a remote system (e.g., the remote system 160 from FIG. 1) and communicate with additional users. Each of these computing devices may include respective components, such as user interface input components (e.g., microphone(s), vision component(s), presence sensor(s), touch sensitive display(s), keyboard(s), hardware button(s), software button(s), etc.), user interface output components (e.g., touch sensitive display(s), speaker(s), monitor(s), projector(s), etc.), network interface(s), and/or other components. Accordingly, although interactions 500A, 500B, and 500C of FIGS. 5A, 5B, and 5C, respectively, are depicted as a single interface, it should be understood that is for the sake of illustrating various techniques described herein and is not meant to be limiting.

Referring specifically to FIG. 5A, assume that a user of the client device is initiated provides a natural language description of a chatbot as indicated by interaction 500A1. In various implementations, the corresponding conversation in which the natural language description of the chatbot is provided may be initiated as part of a dialog between the user of the client device and an automated assistant executing at least in part at the client device. The natural language description of the chatbot can be provided as one or more inputs by the user of the client device. As shown in FIG. 5A, the natural language description of the chatbot is provided across a plurality of unstructured free-form natural language inputs 552A1, 554A1, 556A1, 558A1, 560A1, and 562A1. The plurality of unstructured free-form natural language inputs 552A1, 554A1, 556A1, 558A1, 560A1, and 562A1 may be provided as spoken inputs, typed inputs, or imported from another software application (e.g., as a text-based document). For example, the user of the client device may invoke the automated assistant executing at least in part at the client device (e.g., by actuation of a software or hardware button, by speaking a particular term or phrase such as "Assistant", "Hey Assistant", or the like, and/or by other means) and provide the plurality of unstructured free-form natural language inputs 552A1, 554A1, 556A1, 558A1, 560A1, and 562A1 as spoken inputs. As another example, the user of the client device may access an automated assistant application that is accessible at the client device and that is associated with the automated assistant and provide the plurality of unstructured free-form natural language inputs 552A1, 554A1, 556A1, 558A1, 560A1, and 562A1 as typed inputs. As yet another example, the user of the client device may utilize a separate text processing software application to generate the natural language description of the chatbot described by the plurality of unstructured free-form natural language inputs 552A1, 554A1, 556A1, 558A1, 560A1, and 562A1 may import a text-based document from the separate text processing software application. Although the natural language description is shown in FIG. 5A as being provided across the plurality of unstructured free-form natural language inputs 552A1, 554A1, 556A1, 558A1, 560A1, and 562A1, it should be understood that is for the sake of example and is not meant to be limiting. For instance, in other examples, the natural language description of the chatbot may be provided as a single instance of unstructured free-form natural language input.

For the sake of example in FIG. 5A, assume that the user of the client device is associated with an entity "John's Hardware Store"—a fictitious hardware store—and assume that the user of the client device provides the natural language description of the chatbot by implicitly defining a corresponding dialog state map to be utilized by the chatbot in engaging in corresponding conversations on behalf of "John's Hardware Store". Further assume that the user of the client device provides unstructured free-form natural language input 552A1 of "Start off by greeting the customer, thanking them for calling, and letting them know you are a chatbot capable of handling conversations such that thy can you any question at any time and don't have to wait for you to provide any particular options" as spoken input. In this example, the automated assistant can process, using ASR model(s), audio data that captures the spoken input to generate ASR output such as recognized text corresponding to the spoken input. Further, the automated assistant can process, using NLU model(s), the ASR output to generate NLU output, such as intent(s), slot value(s) for parameters associated with the intent(s), and/or other NLU output. Based on the ASR output and/or the NLU output generated based on processing the unstructured free-form natural language input 552A1, the automated assistant can determine that the user of the client device is implicitly defining a "greeting" dialog state that enables the chatbot to introduce itself when additional users call "John's Hardware Store" and differentiate itself from an interactive voice response (IVR) system by indicating that the additional users "can ask any question at any time" and that they "don't have to wait for [the chatbot] to provide any particular options" like a conventional IVR system. Notably, the user of the client device is implicitly defining the "greeting" dialog state in that the natural language description included in the unstructured free-form natural language input 552A1 defines the "greeting" dialog state without providing any explicit dialog state map (e.g., as described with respect to FIG. 5B).

Further assume that the user of the client device provides unstructured free-form natural language input 554A1 of "If the customer asks any particular question, go ahead and answer the question to assist the customer. However, if the customer does not ask any particular question, go ahead and provide the physical location of the store and the operating hours of the store, and then ask whether they would like to place an order" as spoken input. Based on the ASR output and/or the NLU output generated based on processing the unstructured free-form natural language input 554A1, the automated assistant can determine that the user of the client device is implicitly defining a "store location" dialog state that enables the chatbot to provide the physical location of the store (e.g., where the physical location of the store is determined from one or more databases accessible to the automated assistant or provided by the user), a "store hours" dialog state that enables the chatbot to provide the operating hours of the store (e.g., where the operating hours of the store is determined from one or more databases accessible to the automated assistant or provided by the user), and a "new orders" dialog state that enables the chatbot to place orders over the phone and on behalf of the additional users that engage in the corresponding conversations with the chatbot. Notably, in providing the unstructured free-form natural language input 554A1, the automated assistant can determine that the user of the client device is implicitly defining dialog state transitions that enables the chatbot to transition from the "greeting" dialog state, to the "store location" dialog state, to the "store hours" dialog state, and to the "new hours" dialog state in instances where the additional users do not otherwise ask any questions.

Further assume that the user of the client device provides unstructured free-form natural language input 556A1 of "The physical location of the store is 123 Main St, we are open 9 AM to 5 PM Monday through Friday, and you have access to our inventory to know what the customer can and cannot order" as spoken input. Based on the ASR output and/or the NLU output generated based on processing the unstructured free-form natural language input 556A1, the automated assistant can determine that the user of the client device provided the physical location of the store, the operating hours of the store, and indicated that the chatbot can utilize a remote procedure call (RPC) peripheral behavior that indicates the chatbot is capable of making RPCs to an inventory system of "John's Hardware Store". Although FIG. 5A is described with respect to the user explicitly providing slot values for parameters associated with various dialog states, it should be understood that is for the sake of example and is not meant to be limiting. In other examples, and as noted above, the physical location of the store, the operating hours of the store, and/or other slot values for parameters associated with various dialog states can be determined from one or more databases accessible to the automated assistant.

Further assume that the user of the client device provides unstructured free-form natural language input 558A1 of "If the customer wants to order something, but we do not have inventory, apologize, and tell them that 'we replenish our inventory every Tuesday morning, please call back Tuesday afternoon'" as spoken input, and also provides unstructured free-form natural language input 560A1 of "If the customer successfully places an order, confirm the order, get the payment information for the order, and send the user a confirmation email, or let them pay at the store" as spoken input. Based on the ASR output and/or the NLU output generated based on processing the unstructured free-form natural language input 558A1, the automated assistant can determine that the user of the client device provided information for how to handle any unsuccessful orders at the "new orders" dialog state in that the user provides explicit output to be provided by the chatbot in these scenarios (e.g., by providing "we replenish our inventory every Tuesday morning, please call back Tuesday afternoon"). Further, based on the ASR output and/or the NLU output generated based on processing the unstructured free-form natural language input 560A1, the automated assistant can determine that the user of the client device implicitly defined an "order confirmation" dialog state that enables the chatbot to accept orders for available inventory and optionally enable the additional users that engage in the corresponding conversations with the chatbot to pay for the order or hold off payment for the order until arriving at the store to pick up the order.

Further assume that the user of the client device provides unstructured free-form natural language input 562A1 of "End by thanking the customer for their time and business" as spoken input. Based on the ASR output and/or the NLU output generated based on processing the unstructured free-form natural language input 562A1, the automated assistant can determine that the user of the client device is implicitly defining an "end" dialog state that enables the chatbot to conclude the corresponding conversations with the additional users. Thus, the automated assistant may provide a response 564A1 of "Okay, I'll use this information in handling future conversations" for audible and/or visual presentation to the user of the client device to indicate that the automated assistant will generate the chatbot described by the plurality of unstructured free-form natural language inputs 552A1, 554A1, 556A1, 558A1, 560A1, and 562A1, and utilize the chatbot in engaging in corresponding conversations with the additional users.

For instance, the automated assistant can cause the client device and/or the remote system to generate the chatbot to engage in the corresponding conversations with the additional users. In some implementations, the chatbot may correspond to, for example, a previously trained LLM that is fine-tuned based on the plurality of unstructured free-form natural language inputs 552A1, 554A1, 556A1, 558A1, 560A1, and 562A1 using various fine-tuning techniques (e.g., as described with respect to FIG. 2). In other implementations, the chatbot may correspond to, for example, a previously trained LLM that is not fine-tuned based on the plurality of unstructured free-form natural language inputs 552A1, 554A1, 556A1, 558A1, 560A1, and 562A1, but is primed based on one or more of the plurality of unstructured free-form natural language inputs 552A1, 554A1, 556A1, 558A1, 560A1, and 562A1. Accordingly, the automated assistant can cause the chatbot to be implemented at a computing device, such as the client device in implementations where the chatbot is generated locally at the client device or the remote system in implementations where the chatbot is generated remotely from the client device. One non-limiting example of the automated assistant causing the chatbot generated based on the natural language description of FIG. 5A is described with respect to FIG. 5C. Although interaction 500A is described with respect to the user of the client device implicitly defining the corresponding dialog state map (e.g., the corresponding dialog states and corresponding dialog state transitions) for the chatbot, it should be understood that is for the sake of example.

For example, and referring to interaction 500B of FIG. 5B, the user of the client device may alternatively define the same corresponding dialog state map in an explicit manner, but still utilizing unstructured free-form natural language input. For instance, interaction 500B can be implemented at an interface that enables the user of the client device to explicitly define the corresponding dialog states and the corresponding dialog state transitions. As shown in FIG. 5B, dialog state 552B1 corresponds to the "greeting" dialog state that was implicitly defined by the unstructured free-form natural language input 552A1 from FIG. 5A and includes the same unstructured free-form natural language input as the unstructured free-form natural language input 552A1 from FIG. 5A. Further, dialog state 554B1 corresponds to the "store location" dialog state, dialog state 556B1 corresponds to the "store hours" dialog state, and dialog state 558B1 corresponds to the "new order" dialog state (e.g., and the ability to conduct RPCs at this dialog state as indicated by [*CHECK INVENTORY*]) that were implicitly defined by the unstructured free-form natural language input 554A1 from FIG. 5A. Notably, dialog state 554B1 and dialog state 556B1 includes the same unstructured free-form natural language input as the unstructured free-form natural language input 556A1 from FIG. 5A, and dialog state 558B1 includes the same unstructured free-form natural language input as the unstructured free-form natural language inputs 556A1 and 558A1 from FIG. 5A. Moreover, dialog state 560B1 corresponds to the "order confirmation" dialog state that was implicitly defined by the unstructured free-form natural language input 560A1 from FIG. 5A and includes the same unstructured free-form natural language input as the unstructured free-form natural language input 560A1 from FIG. 5A. Lastly, dialog state 562B1 corresponds to the "end" dialog state that was implicitly defined by the unstructured free-form natural language input 562A1 from FIG. 5A and includes the same unstructured free-form natural language input as the unstructured free-form natural language input 562A1 from FIG. 5A. Notably, the arrows between the different dialog states are indicative of the corresponding dialog state transitions, and may also be explicitly defined by the user in the example of FIG. 5B.

Accordingly, techniques described herein not only enable the user to implicitly define the corresponding dialog states and dialog state transitions are described with respect to FIG. 5A, but techniques described herein also enable the user to explicitly define the corresponding dialog states and dialog state transitions are described with respect to FIG. 5B. In various implementations, the explicit dialog map of FIG. 5B may be generated based on the plurality of unstructured free-form natural language inputs 552A1, 554A1, 556A1, 558A1, 560A1, and 562A1 from FIG. 5A (e.g., through utilization of the dialog state(s)/transition(s) identification engine 183 of FIGS. 1 and 2). Although the chatbot is described as being generated in different manners (e.g., implicitly in FIG. 5A and explicitly in FIG. 5B), the chatbot may engage in the corresponding conversations with the additional users in the same or similar manner.

For example, and referring specifically to FIG. 5C, assume that a user (e.g., "Jane Doe") of an additional client device initiates a phone call with "John's Hardware Store", and that the chatbot answers the phone call on behalf of "John's Hardware Store" as shown in interaction 500C1. In this example, the automated assistant can cause the chatbot to generate an instance of synthesized speech audio data that captures synthesized speech 552C1 of "Hi, thanks for calling John's Hardware Store, I'm a virtual assistant and can handle any of your questions or other needs". Further, the automated assistant can cause the instance of the synthesized speech audio data that captures the synthesized speech 552C1 to be transmitted to the additional client device of the additional user such that the instance of the synthesized speech audio data can be audibly rendered for presentation to the additional user.

In this example, and in generating the synthesized speech 552C1, the automated assistant can process data associated with the "greeting" dialog state from FIGS. 5A and 5B to generate the instance of the synthesized speech audio data. The data can include, for example, state/transition data associated with the "greeting" dialog state, conversation context data, and/or other data. Further, in generating the instance of the synthesized speech audio data, the automated assistant can cause the data associated with the "greeting" dialog state to be applied as input across the previously trained LLM that is fine-tuned and/or primed based on interaction 500A1 from FIG. 5A and/or interaction 500B1 from FIG. 5B to generate output, such as a probability distribution over a vocabulary of terms and/or phrases. Based on the probability distribution over the vocabulary of terms and/or phrases, the automated assistant can cause the chatbot to select textual data corresponding to the synthesized speech 552C1. Further, the automated assistant can cause the chatbot to process, using TTS model(s), the textual data corresponding to the synthesized speech 552C1 to generate the instance of the synthesized speech audio data that is audibly rendered at the additional client device of the additional user. Moreover, the automated assistant is capable of causing the chatbot to generate the output and/or select the textual data corresponding to the synthesized speech 552C1 due at least in part to the previously trained LLM being fine-tuned and/or primed based on the unstructured free-form natural language inputs provided by the user during interaction 500A1 from FIG. 5A and/or interaction 500B1 from FIG. 5B.

Further assume that the Jane Doe responds to the synthesized speech 552C1 with spoken input 554C1 of "Hi, this is Jane Doe, I was wondering if you had any 50 Watt lightbulbs in stock?" In this example, the automated assistant can cause the chatbot to process, using ASR model(s), audio data that captures the spoken input 554C1 to generate ASR output. Further, the automated assistant can cause the chatbot to process, using NLU model(s), the ASR output to generate NLU output. Moreover, the automated assistant can cause the chatbot to process, using fulfillment model(s) and/or fulfillment rule(s), the NLU output to generate fulfillment output. In this manner, the automated assistant can cause the chatbot to determine that Jane Doe is requesting an inventory check for 50 Watt lightbulbs and, as a result, cause the chatbot to perform an RPC of an inventory system to determine available inventory of 50 Watt lightbulbs.

Accordingly, and assuming there is availability of the 50 Watt lightbulb, the automated assistant can cause the chatbot to generate an additional instance of synthesized speech audio data that captures synthesized speech 556C1 of "Let me check" followed by the RPC to the inventory system, and followed by "Yes, we have plenty in stock" based on the results of the RPC to the inventory system. Further, the automated assistant can cause the additional instance of synthesized speech audio data that captures the synthesized speech 556C1 to be transmitted to the additional client device of the additional user such that the additional instance of the synthesized speech audio data can be audibly rendered for presentation to the additional user. In this example, and in generating the synthesized speech 556C1, the automated assistant can process data associated with the "new order" dialog state from FIGS. 5A and 5B to generate the additional instance of the synthesized speech audio data. The data can include, for example, state/transition data associated with the "new order" dialog state, conversation context data, inventory availability data from the RPC to the inventory system, and/or other data and in the same or similar manner described with respect to the synthesized speech 552C1.

Further assume that the Jane Doe responds to the synthesized speech 556C1 with spoken input 558C1 of "Great, I would like to purchase 10 of them". In this example, the automated assistant can cause the chatbot to process, using ASR model(s), audio data that captures the spoken input 558C1 to generate ASR output. Further, the automated assistant can cause the chatbot to process, using NLU model(s), the ASR output to generate NLU output. Moreover, the automated assistant can cause the chatbot to process, using fulfillment model(s) and/or fulfillment rule(s), the NLU output to generate fulfillment output. In this manner, the automated assistant can cause the chatbot to determine that Jane Doe would like to purchase 10, 50 Watt lightbulbs.

Accordingly, the automated assistant can cause the chatbot to generate a further additional instance of synthesized speech audio data that captures synthesized speech 560C1 of "Excellent, they are $3.99 each for a total of $42.29 after tax, would you like to pay now or when you get to the store?" Further, the automated assistant can cause the further additional instance of synthesized speech audio data that captures the synthesized speech 560C1 to be transmitted to the additional client device of the additional user such that the further additional instance of the synthesized speech audio data can be audibly rendered for presentation to the additional user. In this example, and in generating the synthesized speech 560C1, the automated assistant can process additional data associated with the "new order" dialog state from FIGS. 5A and 5B to generate the further additional instance of the synthesized speech audio data. The data can include, for example, state/transition data associated with the "new order" dialog state, conversation context data, inventory price data from the RPC to the inventory system, and/or other data and in the same or similar manner described with respect to the synthesized speech 552C1.

Further assume that the Jane Doe responds to the synthesized speech 560C1 with spoken input 562C1 of "When I get there" In this example, the automated assistant can cause the chatbot to process, using ASR model(s), audio data that captures the spoken input 562C1 to generate ASR output. Further, the automated assistant can cause the chatbot to process, using NLU model(s), the ASR output to generate NLU output. Moreover, the automated assistant can cause the chatbot to process, using fulfillment model(s) and/or fulfillment rule(s), the NLU output to generate fulfillment output. In this manner, the automated assistant can cause the chatbot to determine that Jane Doe would like to pay for the lightbulbs upon arrival at the store rather than during the phone call.

Accordingly, the automated assistant can cause the chatbot to generate a yet further additional instance of synthesized speech audio data that captures synthesized speech 564C1 of "That works for us, you can pick them up at 123 Main St any Monday-Friday between 9 AM and 5 PM" Further, the automated assistant can cause the yet further additional instance of synthesized speech audio data that captures the synthesized speech 564C1 to be transmitted to the additional client device of the additional user such that the yet further additional instance of the synthesized speech audio data can be audibly rendered for presentation to the additional user. In this example, and in generating the synthesized speech 564C1, the automated assistant can process additional data associated with the "store location" and "store hours" dialog states from FIGS. 5A and 5B to generate the yet further additional instance of the synthesized speech audio data. The data can include, for example, state/transition data associated with the "store location" dialog state, the "store hours" dialog state, conversation context data, and/or other data and in the same or similar manner described with respect to the synthesized speech 552C1.

Further assume that the Jane Doe responds to the synthesized speech 564C1 with spoken input 566C1 of "Thanks, see you this afternoon". In this example, the automated assistant can cause the chatbot to process, using ASR model(s), audio data that captures the spoken input 566C1 to generate ASR output. Further, the automated assistant can cause the chatbot to process, using NLU model(s), the ASR output to generate NLU output. Moreover, the automated assistant can cause the chatbot to process, using fulfillment model(s) and/or fulfillment rule(s), the NLU output to generate fulfillment output. In this manner, the automated assistant can cause the chatbot to determine that Jane Doe plans to pick up the 10, 50 lightbulbs at the store the same afternoon.

Accordingly, the automated assistant can cause the chatbot to generate an even yet further additional instance of synthesized speech audio data that captures synthesized speech 568C1 of "We appreciate your business, see you shortly" Further, the automated assistant can cause the even yet further additional instance of synthesized speech audio data that captures the synthesized speech 564C1 to be transmitted to the additional client device of the additional user such that the even yet further additional instance of the synthesized speech audio data can be audibly rendered for presentation to the additional user. In this example, and in generating the synthesized speech 568C1, the automated assistant can process additional data associated with the "end" dialog state from FIGS. 5A and 5B to generate the even yet further additional instance of the synthesized speech audio data. The data can include, for example, state/transition data associated with the "end" dialog state, conversation context data, and/or other data and in the same or similar manner described with respect to the synthesized speech 552C1.

Notably, in interaction 500C1 depicted in FIG. 5C, the additional user is able to drive the corresponding conversation by providing various spoken inputs, and the chatbot is able to respond to the additional user and engage in the corresponding conversation by utilizing the natural language description(s) provided by the user in FIG. 5A and/or FIG. 5B. Further, and as shown in interaction 500C2, the automated assistant can determine responsive content 552C2 that can be provided for presentation to the user. The responsive content 552C2 can include a result of the corresponding conversation between Jane Doe and the chatbot, such as "Jane Doe will be here this afternoon to pick up 10, 50 Watt lightbulbs—she will pay when she gets here". Thus, the interaction 500C2 may be a notification that is generated for presentation to the user, or provided for presentation to the user during a subsequent dialog session between the user and the automated assistant executing at least in part at the client device.

Although FIG. 5C is described with respect to the corresponding conversations being a phone call, it should be understood that is for the sake of example and is not meant to be limiting. For example, the corresponding conversation may be a text-based conversation conducted through any text-based platform or service through which the chatbot can engage in the corresponding conversation (e.g., text or SMS messaging, email, and/or other text-based platforms).

Figure 6:
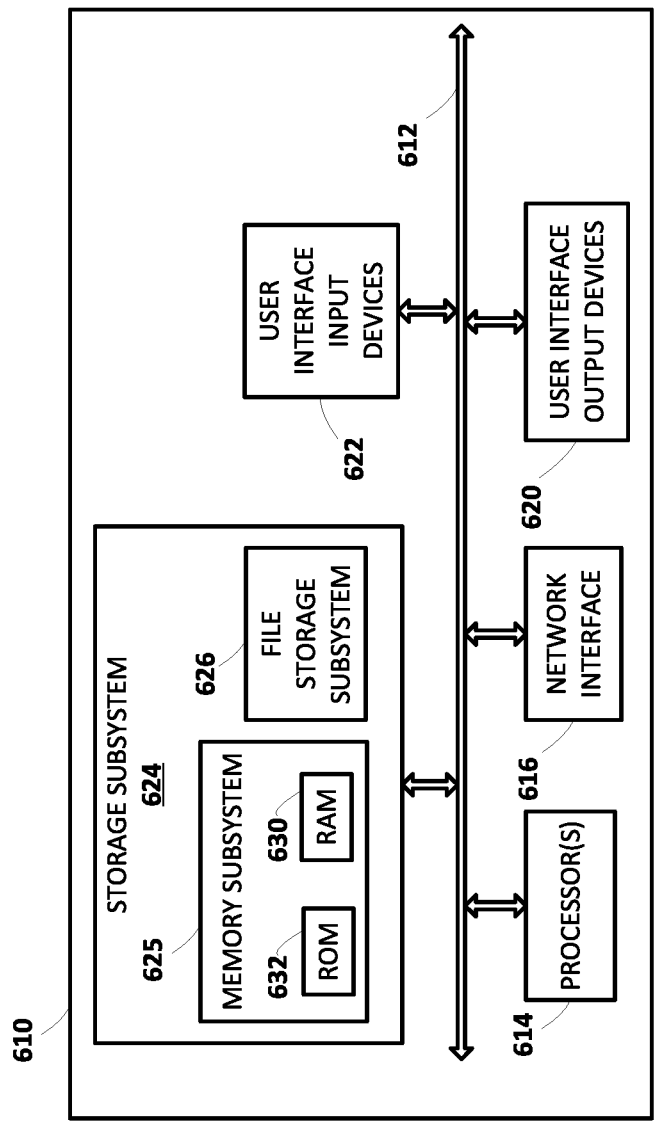
FIG. 6 depicts an example architecture of a computing device, in accordance with various implementations.

Turning now to FIG. 6, a block diagram of an example computing device 610 that may optionally be utilized to perform one or more aspects of techniques described herein. In some implementations, one or more of a client device, remote system component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors of a client device is provided, and includes: receiving, at the client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map; in response to receiving the unstructured free-form natural language input that includes the natural language description of the corresponding dialog state map: generating, based on the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes: causing the chatbot to render a plurality of instances of synthesized speech audio data for presentation to the given additional user; and causing responsive content, that is determined responsive to rendering one or more of the plurality of instances of synthesized speech for presentation to the given additional user, to be provided for presentation to the user of the client device. One or more of the plurality of instances of synthesized speech are generated based on the implicit dialog states and/or the implicit dialog state transitions.

These and other implementations of technology disclosed herein can optionally include one or more of the following features.

In some implementations, generating the chatbot to engage in the plurality of corresponding conversations with the additional users and on behalf of the entity may include obtaining a previously trained large language model (LLM); causing the previously trained LLM to be fine-tuned based on the unstructured free-form natural language input to generate a fine-tuned LLM; and utilizing the fine-tuned LLM as the chatbot.

In some versions of those implementations, causing the chatbot to render a given instance of synthesized speech, from among the plurality of instances of synthesized speech, for presentation to the given additional user may include processing, using the fine-tuned LLM, one or more features associated with a given implicit dialog state, of the implicit dialog states, to generate an instance of textual data that reflects a given behavior of the given implicit dialog state; processing, using a text-to-speech (TTS) model, the given instance of textual data that that reflects the given behavior of the given implicit dialog state to generate the given instance of synthesized speech; and transmitting, from the client device and to an additional client device of the given additional user, the given instance of synthesized speech. Transmitting the given instance of synthesized speech to the additional client device may cause the additional client device to audibly render the given instance of synthesized speech for presentation to the given additional user via one or more speakers of the additional client device.

In some further versions of those implementations, the method may further include processing, using the fine-tuned LLM, and along with one or more of the features associated with a given implicit dialog state, a corresponding context of the corresponding conversation to generate the given instance of textual data that reflects the given behavior of the given implicit dialog state.

In additional or alternative further versions of those implementations, the method may further include, in response to the given instance of synthesized speech being audibly rendered for presentation to the given additional user via the one or more speakers of the additional client device: receiving, at the client device and from the additional client device, a given instance of response audio data that includes the responsive content that is responsive to at least the given instance of synthesized speech; processing, using an automatic speech recognition (ASR) model, the given instance of response audio data to generate a given instance of response textual data; and determining, based on the given instance of response textual data, whether to: process, using the fine-tuned LLM, one or more features associated with the given implicit dialog state and the response textual data to generate an additional instance of textual data that reflects the given behavior of the given implicit dialog state, or process, using the fine-tuned LLM, one or more additional features associated with a given additional implicit dialog state, of the implicit dialog states, and the response textual data to generate an additional instance of textual data that reflects a given additional behavior of the given additional implicit dialog state.

In yet further versions of those implementations, causing the responsive content to be provided for presentation to the user of the client device may include a result of the corresponding conversation.

In additional or alternative further versions of those implementations, the method may further include, prior to processing one or more of the features associated with the given implicit dialog state using the fine-tuned LLM: extracting one or more of the features from the unstructured free-form natural language input.

In yet further versions of those implementations, one or more of the features may be explicitly included in the unstructured free-form natural language input, and extracting one or more of the features from the unstructured free-form natural language input that are explicitly included in the unstructured free-form natural language input may include utilizing an input parser to extract one or more of the features are explicitly included in the unstructured free-form natural language input.

In even yet further versions of those implementations, the method may further include causing the fine-tuned LLM to utilize one or more of the features in generating the instance of textual data that reflects the given behavior of the given implicit dialog state.

In additional or alternative yet further versions of those implementations, one or more of the features may be implicitly included in the unstructured free-form natural language input, and extracting one or more of the features from the unstructured free-form natural language input that are implicitly included in the unstructured free-form natural language input may include utilizing an input parser to identify one or more of the features are implicitly included in the unstructured free-form natural language input; and utilizing a coreference resolver to extract one or more of the features are implicitly included in the unstructured free-form natural language input.

In even yet further versions of those implementations, the method may further include causing the fine-tuned LLM to utilize one or more of the features in generating the instance of textual data that reflects the given behavior of the given implicit dialog state.

In additional or alternative versions of those implementations, the previously trained LLM may be stored in on-device storage of the client device, and the previously trained LLM that is stored in the on-device storage of the client device may be a sparsified version of a global previously trained LLM that is available at a remote system communicatively coupled to the client device.

In some further versions of those implementations, the fine-tuned LLM may be stored in the on-device storage of the client device.

In some implementations, causing the chatbot to engage in the given corresponding conversation with the given additional user may include causing the chatbot to answer a telephone call that is received at the client device and from the given additional entity; and causing the chatbot to engage in the corresponding conversation with the entity as part of the telephone call.

In some implementations, the user may not be an active participant in the corresponding conversation between the chatbot and the given additional user.

In some implementations, a method implemented by one or more processors of a remote system is provided, and includes: receiving, at the remote system and from a client device, an indication of unstructured free-form natural language input from a user of the client device and on behalf of an entity, the indication of the unstructured free-form natural language input including a natural language description of a corresponding dialog state map, the indication of the natural language description of the corresponding dialog state map defining implicit dialog states and implicit dialog state transitions of the corresponding dialog state map and without defining any explicit dialog states or any explicit dialog state transitions of the corresponding dialog state map; in response to receiving the indication of the unstructured free-form natural language input that includes the indication of the natural language description of the corresponding dialog state map: generating, based on the indication of the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of synthesized speech for presentation to the given additional user; and transmitting, from the remote system and to the client device, an indication of the responsive content. One or more of the plurality of instances of synthesized speech are generated based on the implicit dialog states and/or the implicit dialog state transitions. Further, transmitting the indication of the responsive content to the client device causes the client device to provide the responsive content for presentation to the user of the client device.

These and other implementations of technology disclosed herein can optionally include one or more of the following features.

In some implementations, generating the chatbot to engage in the plurality of corresponding conversations with the additional users and on behalf of the entity may include obtaining a previously trained large language model (LLM); causing the previously trained LLM to be fine-tuned based on the unstructured free-form natural language input to generate a fine-tuned LLM; and utilizing the fine-tuned LLM as the chatbot.

In some versions of those implementations, the previously trained LLM may be stored in remote storage of the remote system, and the previously trained LLM that may be stored in the remote storage of the remote system is an unsparsified version of a global previously trained LLM that is available at the remote system communicatively coupled to the client device.

In some further versions of those implementations, the fine-tuned LLM may be stored in the remote storage of the remote system.

In some implementations, a method implemented by one or more processors of a client device is provided, and includes: receiving, at the client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map; in response to receiving the unstructured free-form natural language input that includes the natural language description of the corresponding dialog state map: generating, based on the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of textual data for presentation to the given additional user; and causing responsive content, that is determined responsive to rendering one or more of the plurality of instances of textual data for presentation to the given additional user, to be provided for presentation to the user of the client device. One or more of the plurality of instances of textual data are generated based on the implicit dialog states and/or the implicit dialog state transitions.

In some implementations, a method implemented by one or more processors of a client device is provided, and includes: receiving, at the remote system and from a client device, an indication of unstructured free-form natural language input from a user of the client device and on behalf of an entity, the indication of the unstructured free-form natural language input including an indication of a natural language description of a corresponding dialog state map, the indication of the natural language description of the corresponding dialog state map defining implicit dialog states and implicit dialog state transitions of the corresponding dialog state map and without defining any explicit dialog states or any explicit dialog state transitions of the corresponding dialog state map; in response to receiving the indication of the unstructured free-form natural language input that includes the indication of the natural language description of the corresponding dialog state map: generating, based on the indication of the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of textual data for presentation to the given additional user; and transmitting, from the remote system and to the client device, an indication of the responsive content. One or more of the plurality of instances of textual data are generated based on the implicit dialog states and/or the implicit dialog state transitions. Furhter, transmitting the indication of the responsive content to the client device causes the client device to provide the responsive content for presentation to the user of the client device.

In some implementations, a method implemented by one or more processors of a client device is provided, and includes: receiving, at the client device, a corresponding dialog state map from a user of the client device, the corresponding dialog state map including explicit dialog states and explicit dialog state transitions; receiving, at the client device, and for each of the explicit dialog states, corresponding unstructured free-form natural language input from the user and on behalf of the entity, the corresponding unstructured free-form natural language input including a natural language description for each of the explicit dialog states and the explicit dialog state transitions; in response to receiving the unstructured free-form natural language input that includes the natural language description for each of the explicit dialog states and the explicit dialog state transitions: generating, based on the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of synthesized speech for presentation to the given additional user; and causing responsive content, that is determined responsive to rendering one or more of the plurality of instances of synthesized speech for presentation to the given additional user, to be provided for presentation to the user of the client device. One or more of the plurality of instances of synthesized speech are generated based on the natural language description for each of the explicit dialog states and the explicit dialog state transitions.

In some implementations, a method implemented by one or more processors of a remote system is provided, and includes: receiving, at the remote system and from a client device, an indication of a corresponding dialog state map from a user of the client device, the indication of the corresponding dialog state map including explicit dialog states and explicit dialog state transitions; receiving, at the remote system and from the client device, and for each of the explicit dialog states, an indication of a corresponding unstructured free-form natural language input from the user and on behalf of the entity, the indication of the corresponding unstructured free-form natural language input including a natural language description for each of the explicit dialog states and the explicit dialog state transitions; in response to receiving the indication of the unstructured free-form natural language input that includes the natural language description for each of the explicit dialog states and the explicit dialog state transitions: generating, based on the indication of the unstructured free-form natural language input, a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of synthesized speech for presentation to the given additional user; and transmitting, from the remote system and to the client device, an indication of the responsive content. One or more of the plurality of instances of synthesized speech are generated based on the natural language description for each of the explicit dialog states and the explicit dialog state transitions. Transmitting the indication of the responsive content to the client device causes the client device to provide the responsive content for presentation to the user of the client device.

In some implementations, a method implemented by one or more processors of a client device is provided, and includes: receiving, at the client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map; in response to receiving the unstructured free-form natural language input that includes the natural language description of the corresponding dialog state map, identifying a chatbot to engage in a plurality of corresponding conversations with additional users and on behalf of the entity; and causing the chatbot to engage in the plurality of corresponding conversations with additional users and on behalf of the entity. Causing the chatbot to engage in a given corresponding conversation, of the plurality of corresponding conversations, with a given additional user, of the additional users, and on behalf of the entity includes causing the chatbot to render a plurality of instances of synthesized speech audio data for presentation to the given additional user; and causing responsive content, that is determined responsive to rendering one or more of the plurality of instances of synthesized speech for presentation to the given additional user, to be provided for presentation to the user of the client device. One or more of the plurality of instances of synthesized speech are generated based on the implicit dialog states and/or the implicit dialog state transitions.

These and other implementations of technology disclosed herein can optionally include one or more of the following features.

In some implementations, identifying the chatbot to engage in the plurality of corresponding conversations with the additional users and on behalf of the entity includes obtaining a previously trained large language model (LLM); and causing the previously trained LLM to be utilized as the chatbot.

In some versions of those implementations, the previously trained LLM may be stored in on-device storage of the client device, and the previously trained LLM that may be stored in the on-device storage of the client device may be a sparsified version of a global previously trained LLM that is available at a remote system communicatively coupled to the client device.

In additional or alternative versions of those implementations, the method may further include refraining from causing the previously trained LLM to be fine-tuned based on the unstructured free-form natural language input.

In additional or alternative versions of those implementations, causing the chatbot to render a given instance of synthesized speech, from among the plurality of instances of synthesized speech, for presentation to the given additional user may include processing, using the previously trained LLM, the unstructured free-form natural language input and one or more features associated with a given implicit dialog state, of the implicit dialog states, to generate an instance of textual data that reflects a given behavior of the given implicit dialog state; processing, using a text-to-speech (TTS) model, the given instance of textual data that that reflects the given behavior of the given implicit dialog state to generate the given instance of synthesized speech; and transmitting, from the client device and to an additional client device of the given additional user, the given instance of synthesized speech. Transmitting the given instance of synthesized speech to the additional client device causes the additional client device to audibly render the given instance of synthesized speech for presentation to the given additional user via one or more speakers of the additional client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors of a client device, the method comprising:
    receiving, at the client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map;
    in response to receiving the unstructured free-form natural language input that includes the natural language description of the corresponding dialog state map:
        generating, based on the unstructured free-form natural language input, a chatbot to engage in a plurality of corresponding conversations with additional users and on behalf of the entity, wherein generating the chatbot to engage in the plurality of corresponding conversations with the additional users and on behalf of the entity comprises:
            obtaining a previously trained large language model (LLM); and
            causing the previously trained LLM to be fine-tuned or instruction-tuned based on the unstructured free-form natural language input to generate the chatbot; and
    causing the chatbot to engage in the plurality of corresponding conversations with the additional users and on behalf of the entity, wherein causing the chatbot to engage in a given corresponding conversation, of the plurality of corresponding conversations, with a given additional user, of the additional users, and on behalf of the entity comprises:
        causing the chatbot to render a plurality of instances of synthesized speech audio data for presentation to the given additional user as part of the given corresponding conversation, wherein one or more of the plurality of instances of synthesized speech is generated based on the implicit dialog states and/or the implicit dialog state transitions;
        causing the chatbot to process a plurality of instances of response audio data that captures one or more spoken utterances provided by the given additional user as part of the given corresponding conversation;
        determining, based on the plurality of instances of synthesized speech audio data rendered for presentation to the given additional user as part of the given corresponding conversation and based on the plurality of instances of response audio data provided by the given additional user as part of the given corresponding conversation, responsive content to be provided for presentation to the user of the client device, wherein the responsive content includes a given corresponding summary of the given corresponding conversation; and
        causing the responsive content to be provided for presentation to the user of the client device.

2. The method of claim 1, wherein causing the previously trained LLM to be fine-tuned or instruction-tuned based on the unstructured free-form natural language input to generate the chatbot comprises causing the previously trained LLM to be fine-tuned to generate a fine-tuned LLM, and wherein causing the chatbot to render a given instance of synthesized speech, from among the plurality of instances of synthesized speech, for presentation to the given additional user comprises:

processing, using the fine-tuned LLM, one or more features associated with a given implicit dialog state, of the implicit dialog states, to generate a given instance of textual data that reflects a given behavior of the given implicit dialog state;

processing, using a text-to-speech (TTS) model, the given instance of textual data that reflects the given behavior of the given implicit dialog state to generate the given instance of synthesized speech; and transmitting, from the client device and to an additional client device of the given additional user, the given instance of synthesized speech, wherein transmitting the given instance of synthesized speech to the additional client device causes the additional client device to audibly render the given instance of synthesized speech for presentation to the given additional user via one or more speakers of the additional client device.

3. The method of claim 2, further comprising:
processing, using the fine-tuned LLM, and along with one or more of the features associated with the given implicit dialog state, a corresponding context of the corresponding conversation to generate the given instance of textual data that reflects the given behavior of the given implicit dialog state.

4. The method of claim 2, further comprising:
in response to the given instance of synthesized speech being audibly rendered for presentation to the given additional user via the one or more speakers of the additional client device:
receiving, at the client device and from the additional client device, a given instance of response audio data, of the plurality of instances of response audio data, that includes one or more of the spoken utterances provided by the given additional user as part of the given corresponding conversation;
processing, using an automatic speech recognition (ASR) model, the given instance of response audio data to generate a given instance of response textual data; and
determining, based on the given instance of response textual data, whether to:
process, using the fine-tuned LLM, one or more features associated with the given implicit dialog state and the response textual data to generate an additional instance of textual data that reflects the given behavior of the given implicit dialog state, or
process, using the fine-tuned LLM, one or more additional features associated with a given additional implicit dialog state, of the implicit dialog states, and the response textual data to generate an additional instance of textual data that reflects a given additional behavior of the given additional implicit dialog state.

5. The method of claim 2, further comprising:
prior to processing one or more of the features associated with the given implicit dialog state using the fine-tuned LLM:
extracting one or more of the features from the unstructured free-form natural language input.

6. The method of claim 5, wherein one or more of the features are explicitly included in the unstructured free-form natural language input, and wherein extracting one or more of the features from the unstructured free-form natural language input that are explicitly included in the unstructured free-form natural language input comprises:
utilizing an input parser to extract one or more of the features that are explicitly included in the unstructured free-form natural language input.

7. The method of claim 6, further comprising:
causing the fine-tuned LLM to utilize one or more of the features in generating the instance of textual data that reflects the given behavior of the given implicit dialog state.

8. The method of claim 5, wherein one or more of the features are implicitly included in the unstructured free-form natural language input, and wherein extracting one or more of the features from the unstructured free-form natural language input that are implicitly included in the unstructured free-form natural language input comprises:
utilizing an input parser to identify one or more of the features that are implicitly included in the unstructured free-form natural language input; and
utilizing a coreference resolver to extract one or more of the features that are implicitly included in the unstructured free-form natural language input.

9. The method of claim 8, further comprising:
causing the fine-tuned LLM to utilize one or more of the features in generating the instance of textual data that reflects the given behavior of the given implicit dialog state.

10. The method of claim 1, wherein the previously trained LLM is stored in on-device storage of the client device, and wherein the previously trained LLM that is stored in the on-device storage of the client device is a sparsified version of a global previously trained LLM that is available at a remote system communicatively coupled to the client device.

11. The method of claim 10, wherein the fine-tuned LLM is stored in the on-device storage of the client device.

12. The method of claim 1, wherein causing the chatbot to engage in the given corresponding conversation with the given additional user comprises:
causing the chatbot to answer a telephone call that is received at the client device and from the given additional user; and
causing the chatbot to engage in the corresponding conversation with the given additional user as part of the telephone call.

13. The method of claim 1, wherein the user is not an active participant in the corresponding conversation between the chatbot and the given additional user.

14. A system comprising:
at least one processor; and
memory storing instructions that, when executed, cause the at least one processor to be operable to:
receive, at a client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map;

in response to receiving the unstructured free-form natural language input that includes the natural language description of the corresponding dialog state map:
   generate, based on the unstructured free-form natural language input, a chatbot to engage in a plurality of corresponding conversations with additional users and on behalf of the entity, wherein in generating the chatbot to engage in the plurality of corresponding conversations with the additional users and on behalf of the entity, one or more of the processors are to:
      obtain a previously trained large language model (LLM); and
      cause the previously trained LLM to be fine-tuned or instruction-tuned based on the unstructured free-form natural language input to generate the chatbot; and
cause the chatbot to engage in the plurality of corresponding conversations with the additional users and on behalf of the entity, wherein the instructions to cause the chatbot to engage in a given corresponding conversation, of the plurality of corresponding conversations, with a given additional user, of the additional users, and on behalf of the entity comprise instructions to:
   cause the chatbot to render a plurality of instances of synthesized speech audio data for presentation to the given additional user as part of the given corresponding conversation, wherein one or more of the plurality of instances of synthesized speech is generated based on the implicit dialog states and/or the implicit dialog state transitions;
   cause the chatbot to process a plurality of instances of response audio data that captures one or more spoken utterances provided by the given additional user as part of the given corresponding conversation;
   determine, based on the plurality of instances of synthesized speech audio data rendered for presentation to the given additional user as part of the given corresponding conversation and based on the plurality of instances of response audio data provided by the given additional user as part of the given corresponding conversation, responsive content to be provided for presentation to the user of the client device, wherein the responsive content includes a given corresponding summary of the given corresponding conversation; and
   cause the responsive content to be provided for presentation to the user of the client device.

15. A non-transitory computer-readable storage medium storing computer-readable instructions that, when executed by at least one processor, cause the at least one processor to execute the computer-readable instructions to:
   receive, at a client device, unstructured free-form natural language input from a user of the client device and on behalf of an entity, the unstructured free-form natural language input including a natural language description of a corresponding dialog state map, the natural language description of the corresponding dialog state map defining implicit dialog states and implicit dialog state transitions of the corresponding dialog state map and without defining any explicit dialog states or any explicit dialog state transitions of the corresponding dialog state map;
   in response to receiving the unstructured free-form natural language input that includes the natural language description of the corresponding dialog state map:
      generate, based on the unstructured free-form natural language input, a chatbot to engage in a plurality of corresponding conversations with additional users and on behalf of the entity, wherein in generating the chatbot to engage in the plurality of corresponding conversations with the additional users and on behalf of the entity, one or more of the processors are to:
         obtain a previously trained large language model (LLM); and
         cause the previously trained LLM to be fine-tuned or instruction-tuned based on the unstructured free-form natural language input to generate the chatbot; and
   cause the chatbot to engage in the plurality of corresponding conversations with the additional users and on behalf of the entity, wherein the computer-readable instructions to cause the chatbot to engage in a given corresponding conversation, of the plurality of corresponding conversations, with a given additional user, of the additional users, and on behalf of the entity comprise computer-readable instructions to:
      cause the chatbot to render a plurality of instances of synthesized speech audio data for presentation to the given additional user as part of the given corresponding conversation, wherein one or more of the plurality of instances of synthesized speech is generated based on the implicit dialog states and/or the implicit dialog state transitions;
      cause the chatbot to process a plurality of instances of response audio data that captures one or more spoken utterances provided by the given additional user as part of the given corresponding conversation;
      determine, based on the plurality of instances of synthesized speech audio data rendered for presentation to the given additional user as part of the given corresponding conversation and based on the plurality of instances of response audio data provided by the given additional user as part of the given corresponding conversation, responsive content to be provided for presentation to the user of the client device, wherein the responsive content includes a given corresponding summary of the given corresponding conversation; and
      cause the responsive content to be provided for presentation to the user of the client device.

\* \* \* \* \*